United States Patent
Xie et al.

(10) Patent No.: US 10,338,994 B1
(45) Date of Patent: Jul. 2, 2019

(54) PREDICTING AND ADJUSTING COMPUTER FUNCTIONALITY TO AVOID FAILURES

(71) Applicant: SAS Institute Inc., Cary, NC (US)

(72) Inventors: Jingrui Xie, Cary, NC (US); Yue Li, Irvine, CA (US); Yung-Hsin Chien, Apex, NC (US); Pu Wang, Charlotte, NC (US)

(73) Assignee: SAS INSTITUTE INC., Cary, NC (US)

(*) Notice: Subject to any disclaimer, the term of this patent is extended or adjusted under 35 U.S.C. 154(b) by 0 days.

(21) Appl. No.: 16/165,331

(22) Filed: Oct. 19, 2018

Related U.S. Application Data

(60) Provisional application No. 62/634,117, filed on Feb. 22, 2018.

(51) Int. Cl.
| | |
|---|---|
| *G06F 11/00* | (2006.01) |
| *G06F 11/07* | (2006.01) |
| *H04L 12/24* | (2006.01) |
| *G06N 5/02* | (2006.01) |

(52) U.S. Cl.
CPC ...... *G06F 11/0793* (2013.01); *G06F 11/0727* (2013.01); *G06F 11/0751* (2013.01); *G06F 11/0775* (2013.01); *G06N 5/022* (2013.01); *H04L 41/0816* (2013.01)

(58) Field of Classification Search
CPC ............ G06F 11/0793; G06F 11/0727; G06F 11/0751; G06F 11/0775; G06F 11/3065; G06F 11/3072; G06F 11/3082; G06N 5/022; G06N 5/00; G06N 5/025; G06N 5/04; G06N 5/046; G06N 5/047; G06N 5/048; G06N 7/00; G06N 7/005;
(Continued)

(56) References Cited

U.S. PATENT DOCUMENTS

| | | |
|---|---|---|
| 5,461,699 A | 10/1995 | Arbabi et al. |
| 5,559,895 A | 9/1996 | Lee et al. |
| 5,615,109 A | 3/1997 | Eder |

(Continued)

FOREIGN PATENT DOCUMENTS

WO  2005/124718 A2  12/2005

OTHER PUBLICATIONS

IBM, "IBM SPSS Forecasting 22", version 22, 2013, 44 pages.
(Continued)

*Primary Examiner* — Anthony J Amoroso
(74) *Attorney, Agent, or Firm* — Kilpatrick Townsend & Stockton LLP

(57) ABSTRACT

In some examples, a processing device can receive prediction data representing a prediction. The processing device can also receive files defining abnormal data-point patterns to be identified in the prediction data. The processing device can identify at least one abnormal data-point pattern in the prediction data by executing customizable program-code in the files. The processing device can determine an override process that corresponds to the at least one abnormal data-point pattern in response to identifying the at least one abnormal data-point pattern in the prediction data. The processing device can execute the override process to generate a corrected version of the prediction data. The processing device can then adjust one or more computer parameters based on the corrected version of the prediction data.

30 Claims, 19 Drawing Sheets

(58) Field of Classification Search
CPC ...... G06N 7/02; G06N 7/023; H04L 41/0816;
H04L 41/08; H04L 41/0803; H04L 41/0813
See application file for complete search history.

(56) References Cited

U.S. PATENT DOCUMENTS

| | | |
|---|---|---|
| 5,870,746 A | 2/1999 | Knutson et al. |
| 5,918,232 A | 6/1999 | Pouschine et al. |
| 5,926,822 A | 7/1999 | Garman |
| 5,953,707 A | 9/1999 | Huang et al. |
| 5,991,740 A | 11/1999 | Messer |
| 5,995,943 A | 11/1999 | Bull et al. |
| 6,052,481 A | 4/2000 | Grajski et al. |
| 6,128,624 A | 10/2000 | Papierniak et al. |
| 6,151,582 A | 11/2000 | Huang et al. |
| 6,151,584 A | 11/2000 | Papierniak et al. |
| 6,169,534 B1 | 1/2001 | Raffel et al. |
| 6,189,029 B1 | 2/2001 | Fuerst |
| 6,208,975 B1 | 3/2001 | Bull et al. |
| 6,216,129 B1 | 4/2001 | Eldering |
| 6,223,173 B1 | 4/2001 | Wakio et al. |
| 6,230,064 B1 | 5/2001 | Nakase et al. |
| 6,286,005 B1 | 9/2001 | Cannon |
| 6,308,162 B1 | 10/2001 | Ouimet et al. |
| 6,317,731 B1 | 11/2001 | Luciano |
| 6,334,110 B1 | 12/2001 | Walter et al. |
| 6,356,842 B1 | 3/2002 | Intriligator et al. |
| 6,397,166 B1 | 5/2002 | Leung et al. |
| 6,400,853 B1 | 6/2002 | Shiiyama |
| 6,526,405 B1 | 2/2003 | Mannila et al. |
| 6,539,392 B1 | 3/2003 | Rebane |
| 6,542,869 B1 | 4/2003 | Foote |
| 6,564,190 B1 | 5/2003 | Dubner |
| 6,570,592 B1 | 5/2003 | Sajdak et al. |
| 6,591,255 B1 | 7/2003 | Tatum et al. |
| 6,611,726 B1 | 8/2003 | Crosswhite |
| 6,640,227 B1 | 10/2003 | Andreev |
| 6,662,185 B1 | 12/2003 | Stark et al. |
| 6,735,738 B1 | 5/2004 | Kojima |
| 6,775,646 B1 | 8/2004 | Tufillaro et al. |
| 6,792,399 B1 | 9/2004 | Phillips et al. |
| 6,850,871 B1 | 2/2005 | Barford et al. |
| 6,876,988 B2 | 4/2005 | Helsper et al. |
| 6,878,891 B1 | 4/2005 | Josten et al. |
| 6,928,398 B1 | 8/2005 | Fang et al. |
| 6,978,249 B1 | 12/2005 | Beyer et al. |
| 7,072,863 B1 | 7/2006 | Phillips et al. |
| 7,080,026 B2 | 7/2006 | Singh et al. |
| 7,103,222 B2 | 9/2006 | Peker |
| 7,130,822 B1 | 10/2006 | Their et al. |
| 7,130,833 B2 | 10/2006 | Kashima et al. |
| 7,171,340 B2 | 1/2007 | Brocklebank |
| 7,194,434 B2 | 3/2007 | Piccioli |
| 7,216,088 B1 | 5/2007 | Chappel et al. |
| 7,222,082 B1 | 5/2007 | Adhikari et al. |
| 7,236,940 B2 | 6/2007 | Chappel |
| 7,240,019 B2 | 7/2007 | Delurgio et al. |
| 7,251,589 B1 | 7/2007 | Crowe et al. |
| 7,260,550 B1 | 8/2007 | Notani |
| 7,280,986 B2 | 10/2007 | Goldberg et al. |
| 7,433,834 B2 | 10/2008 | Joao |
| 7,523,048 B1 | 4/2009 | Dvorak |
| 7,530,025 B2 | 5/2009 | Ramarajan et al. |
| 7,562,062 B2 | 7/2009 | Ladde et al. |
| 7,565,417 B2 | 7/2009 | Rowady, Jr. |
| 7,570,262 B2 | 8/2009 | Landau et al. |
| 7,610,214 B1 | 10/2009 | Dwarakanath et al. |
| 7,617,167 B2 | 11/2009 | Griffis et al. |
| 7,660,734 B1 | 2/2010 | Neal et al. |
| 7,689,456 B2 | 3/2010 | Schroeder et al. |
| 7,693,737 B2 | 4/2010 | Their et al. |
| 7,702,482 B2 | 4/2010 | Graepel et al. |
| 7,711,734 B2 | 5/2010 | Leonard et al. |
| 7,716,022 B1 | 5/2010 | Park et al. |
| 7,987,106 B1 | 7/2011 | Aykin |
| 8,005,707 B1 | 8/2011 | Jackson et al. |
| 8,010,324 B1 | 8/2011 | Crowe et al. |
| 8,010,404 B1 | 8/2011 | Wu et al. |
| 8,073,729 B2 | 12/2011 | Kisin et al. |
| 8,112,302 B1 | 2/2012 | Trovero et al. |
| 8,326,677 B1 | 12/2012 | Fan et al. |
| 8,364,517 B2 | 1/2013 | Trovero et al. |
| 8,392,228 B2 | 3/2013 | Mulukutla et al. |
| 8,489,622 B2 | 7/2013 | Joshi et al. |
| 8,631,040 B2 | 1/2014 | Jackson et al. |
| 9,037,998 B2 | 5/2015 | Leonard et al. |
| 9,087,306 B2 | 7/2015 | Leonard et al. |
| 9,147,218 B2 | 9/2015 | Leonard et al. |
| 9,244,887 B2 | 1/2016 | Leonard et al. |
| 9,418,339 B1 | 8/2016 | Leonard et al. |
| 9,818,063 B2 | 11/2017 | Joshi et al. |
| 9,916,282 B2 | 3/2018 | Leonard et al. |
| 2001/0013008 A1 | 8/2001 | Waclawski |
| 2002/0052758 A1 | 5/2002 | Arthur et al. |
| 2002/0169657 A1 | 11/2002 | Singh et al. |
| 2003/0101009 A1 | 5/2003 | Seem |
| 2003/0105660 A1 | 6/2003 | Walsh et al. |
| 2003/0110016 A1 | 6/2003 | Stefek et al. |
| 2003/0154144 A1 | 8/2003 | Pokorny et al. |
| 2003/0187719 A1 | 10/2003 | Brocklebank |
| 2003/0200134 A1 | 10/2003 | Leonard et al. |
| 2003/0212590 A1 | 11/2003 | Klingler |
| 2004/0041727 A1 | 3/2004 | Ishii et al. |
| 2004/0172225 A1 | 9/2004 | Hochberg et al. |
| 2005/0055275 A1 | 3/2005 | Newman et al. |
| 2005/0102107 A1 | 5/2005 | Porikli |
| 2005/0114391 A1 | 5/2005 | Corcoran et al. |
| 2005/0159997 A1 | 7/2005 | John |
| 2005/0177351 A1 | 8/2005 | Goldberg et al. |
| 2005/0209732 A1 | 9/2005 | Audimoolam et al. |
| 2005/0249412 A1 | 11/2005 | Radhakrishnan et al. |
| 2005/0271156 A1 | 12/2005 | Nakano |
| 2006/0063156 A1 | 3/2006 | Willman et al. |
| 2006/0064181 A1 | 3/2006 | Kato |
| 2006/0085380 A1 | 4/2006 | Cote et al. |
| 2006/0112028 A1 | 5/2006 | Xiao et al. |
| 2006/0143081 A1 | 6/2006 | Argaiz |
| 2006/0164997 A1 | 7/2006 | Graepel et al. |
| 2006/0241923 A1 | 10/2006 | Xu et al. |
| 2006/0247859 A1 | 11/2006 | Ladde et al. |
| 2006/0247900 A1 | 11/2006 | Brocklebank |
| 2007/0011175 A1 | 1/2007 | Langseth et al. |
| 2007/0094168 A1 | 4/2007 | Ayala et al. |
| 2007/0106550 A1 | 5/2007 | Umblijs et al. |
| 2007/0118491 A1 | 5/2007 | Baum et al. |
| 2007/0162301 A1 | 7/2007 | Sussman et al. |
| 2007/0203783 A1 | 8/2007 | Beltramo |
| 2007/0208492 A1 | 9/2007 | Downs et al. |
| 2007/0208608 A1 | 9/2007 | Amerasinghe et al. |
| 2007/0291958 A1 | 12/2007 | Jehan |
| 2008/0097802 A1 | 4/2008 | Ladde et al. |
| 2008/0208832 A1 | 8/2008 | Friedlander et al. |
| 2008/0270363 A1 | 10/2008 | Hunt et al. |
| 2008/0288537 A1 | 11/2008 | Golovchinsky et al. |
| 2008/0294651 A1 | 11/2008 | Masuyama et al. |
| 2009/0018996 A1 | 1/2009 | Hunt et al. |
| 2009/0172035 A1 | 7/2009 | Lessing et al. |
| 2009/0319310 A1 | 12/2009 | Little |
| 2010/0030521 A1 | 2/2010 | Akhrarov et al. |
| 2010/0063974 A1 | 3/2010 | Papadimitriou et al. |
| 2010/0114899 A1 | 5/2010 | Guha et al. |
| 2010/0257133 A1 | 10/2010 | Crowe et al. |
| 2011/0119374 A1 | 5/2011 | Ruhl et al. |
| 2011/0145223 A1 | 6/2011 | Cormode et al. |
| 2011/0208701 A1 | 8/2011 | Jackson et al. |
| 2011/0307503 A1 | 12/2011 | Dlugosch |
| 2012/0053989 A1 | 3/2012 | Richard |
| 2013/0024167 A1 | 1/2013 | Blair et al. |
| 2013/0024173 A1 | 1/2013 | Brzezicki et al. |
| 2013/0268318 A1 | 10/2013 | Richard |
| 2014/0019088 A1 | 1/2014 | Leonard et al. |
| 2014/0019448 A1 | 1/2014 | Leonard et al. |
| 2014/0019909 A1 | 1/2014 | Leonard et al. |

(56) References Cited

U.S. PATENT DOCUMENTS

| | | |
|---|---|---|
| 2014/0257778 A1 | 9/2014 | Leonard et al. |
| 2015/0088606 A1 | 3/2015 | Tyagi |
| 2015/0120263 A1 | 4/2015 | Brzezicki et al. |
| 2016/0285700 A1* | 9/2016 | Gopalakrishnan ..... G06N 7/005 |
| 2016/0292324 A1 | 10/2016 | Leonard et al. |
| 2017/0284903 A1 | 10/2017 | Anderson et al. |
| 2018/0174694 A1* | 6/2018 | Mashio ................. G06N 7/005 |

OTHER PUBLICATIONS

Alali, N. et al., "Neural network meta-modeling of steam assisted gravity drainage oil recover process" Iranaian Journal of Chemistry and Chemical Engineering (IJCCE) vol. 29. No. 3 (2010) pp. 109-122.

Kang, P. et al., "A virtual metrology system for semiconductor manufacturing" Expert Systems with Applications, vol. 36. No. 10 (2009) pp. 12554-12561.

Albertos, P. et al., "Virtual sensors for control applications" Annual Reviews in Control, vol. 26, No. 1 (2002) pp. 101-112.

SAS Institute Inc., 2012, SAS(R) 9.3 Language Reference: Concepts, Second Edition, Cary, NC: SAS Institute, Inc. [retrieved from https://support.sas.com/documentation/cdl/en/lrcon/65287/PDF/default/Ircon.pdf] pp. 1,2,395,396,408,411,419.

Trovero, M. A., Joshi, M. V., and Leonard, M. J. 2007. "Efficient Reconciliation of a Hierarchy of Forecasts in Presence of Constraints." Proceedings of the SAS Global Forum 2007 Conference. Cary, NC. SAS Institute Inc., downloaded from http://www2.sas.com/proceedings/forum2007/277-2007.pdf 1 page.

Leonard, M. J., and Elsheimer, B. M. 2015. "Count Series Forecasting." Proceedings of the SAS Global Forum 2015 Conference. Cary, NC. SAS Institute Inc., downloaded from http://support.sas.com/resources/papers/proceedings15/SAS1754-2015.pdf 14 pages.

Leonard, M. J. "Large-Scale Automatic Forecasting: Millions of Forecasts." International Symposium of Forecasting. Dublin (2002) 9 pages.

Aiolfi, Marco et al., "Forecast Combinations," CREATES Research Paper 2010-21, School of Economics and Management, Aarhus University, 35 pp. (May 6, 2010).

Automatic Forecasting Systems Inc., Autobox 5.0 for Windows User's Guide, 82 pp. (1999).

Choudhury, J. Paul et al., "Forecasting of Engineering Manpower Through Fuzzy Associative Memory Neural Network with ARIMA: A Comparative Study", Neurocomputing, vol. 47, Iss. 1-4, pp. 241-257 (Aug. 2002).

Costantini, Mauro et al., "Forecast Combination Based on Multiple Encompassing Tests in a Macroeconomic DSGE System," Reihe Okonomie/ Economics Series 251, 24 pp. (May 2010).

Data Mining Group, available at http://www.dmg.org, printed May 9, 2005, 3 pp.

Funnel Web, Web site Analysis. Report, Funnel Web Demonstration, Authenticated Users History, http://www.quest.com/funnel.sub.--web/analyzer/sample/UserHist.html (2 pp.), Mar. 2002.

Funnel Web, Web site Analysis Report, Funnel Web Demonstration, Clients History, http://www/quest.com/funnel.sub.--web/analyzer/sample.ClientHist-.html (1 p.), Mar. 2002.

Garavaglia, Susan et al., "A Smart Guide to Dummy Variables: Four Applications and a Macro," accessed from: http://web.archive.org/web/20040728083413/http://www.ats.ucla.edu/stat/sa- s/library/nesug98/p046.pdf, (2004).

Guerard John B. Jr., "Automatic Time Series Modeling, Intervention Analysis, and Effective Forecasting", (1989) Journal of Statistical Computation and Simulation, 1563-5163, vol. 34, Issue 1, pp. 43-49.

Guralnik, V. and Srivastava, J., "Event Detection from Time Series Data", (1999), Proceedings of the 5th ACM SIGKDD International Conference on Knowledge Discovery and Data Mining, pp. 33-42.

Harrison, H.C. et al., "An Intelligent Business Forecasting System", ACM Annual Computer Science Conference, pp. 229-236 (1993).

Harvey, Andrew, "Forecasting with Unobserved Components Time Series Models," Faculty of Economics, University of Cambridge, Prepared for Handbook of Economic Forecasting, pp. 1-89 (Jul. 2004).

Jacobsen, Erik et al., "Assigning Confidence to Conditional Branch Predictions", IEEE, Proceedings of the 29th Annual International Symposium on Microarchitecture, 12 pp. (Dec. 2-4, 1996).

Keogh, Eamonn J. et al., "Derivative Dynamic Time Warping", In First SIAM International Conference on Data Mining (SDM'2001), Chicago, USA, pp. 1-11 (2001).

Kobbacy, Khairy A.H., et al., Abstract, "Towards the development of an intelligent inventory management system," Integrated Manufacturing Systems, vol. 10, Issue 6, (1999) 11 pp.

Kumar, Mahesh, "Combining Forecasts Using Clustering", Rutcor Research Report 40-2005, cover page and pp. 1-16 (Dec. 2005).

Leonard, Michael et al., "Mining Transactional and Time Series Data", abstract and presentation, International Symposium of Forecasting, 23 pp. (2003).

Leonard, Michael et al., "Mining Transactional and Time Series Data", abstract, presentation and paper, SUGI, 142 pp. (Apr. 10-13, 2005).

Leonard, Michael, "Large-Scale Automatic Forecasting Using Inputs and Calendar Events", abstract and presentation, International Symposium on Forecasting Conference, 56 pp. (Jul. 4-7, 2004).

Leonard, Michael, "Large-Scale Automatic Forecasting Using Inputs and Calendar Events", White Paper, pp. 1-26 (2005).

Leonard, Michael, "Large-Scale Automatic Forecasting: Millions of Forecasts", abstract and presentation, International Symposium of Forecasting, 156 pp. (2002).

Leonard, Michael, "Predictive Modeling Markup Language for Time Series Models", abstract and presentation, International Symposium on Forecasting Conference, 35 pp. (Jul. 4-7, 2004).

Leonard, Michael, "Promotional Analysis and Forecasting for Demand Planning: A Practical Time Series Approach", with exhibits 1 and 2, SAS Institute Inc., Cary, North Carolina, 50 pp. (2000).

Lu, Sheng et al., "A New Algorithm for Linear and Nonlinear ARMA Model Parameter Estimation Using Affine Geometry", IEEE Transactions on Biomedical Engineering, vol. 48, No. 10, pp. 1116-1124 (Oct. 2001).

Malhotra, Manoj K. et al., "Decision making using multiple models", European Journal of Operational Research, 114, pp. 1-14 (1999).

McQuarrie, Allan D.R. et al., "Regression and Time Series Model Selection", World Scientific Publishing Co. Pte. Ltd., 39 pp. (1998).

Oates, Tim et al., "Clustering Time Series with Hidden Markov Models and Dynamic Time Warping", Computer Science Department, LGRC University of Massachusetts, In Proceedings of the IJCAI-99, 5 pp. (1999).

Park, Kwan Hee, Abstract "Development and evaluation of a prototype expert system for forecasting models", Mississippi State University, 1990, 1 pg.

Product Brochure, Forecast PRO, 2000, 12 pp.

Quest Software, "Funnel Web Analyzer: Analyzing the Way Visitors Interact with Your Web Site", http://www.quest.com/funnel.sub.--web/analyzer (2 pp.), Mar. 2002.

Safavi, Alex "Choosing the right forecasting software and system." The Journal of Business Forecasting Methods & Systems 19.3 (2000): 6-10. ABI/INFORM Global, ProQuest.

SAS Institute Inc., SAS/EtTS User's Guide, Version 8, Cary NC; SAS Institute Inc., (1999) 1543 pages.

Seasonal Dummy Variables, Mar. 2004, http://shazam.econ.ubc.ca/intro/dumseas.htm, Accessed from: http://web.archive.org/web/20040321055948/http://shazam.econ.ubc.ca/intro-/dumseas.htm.

Simoncelli, Eero, "Least Squares Optimization," Center for Neural Science, and Courant Institute of Mathematical Sciences, pp. 1-8 (Mar. 9, 2005).

Tashman, Leonard J. et al., Abstract "Automatic Forecasting Software: A Survey and Evaluation", International Journal of Forecasting, vol. 7, Issue 2, Aug. 1991, 1 pg.

Using Predictor Variables, (1999) SAS OnlineDoc: Version 8, pp. 1325-1349, Accessed from: http://www.okstate.edu/sas/v8/saspdf/ets/chap27.pdf.

(56) References Cited

OTHER PUBLICATIONS van Wijk, Jarke J. et al., "Cluster and Calendar based Visualization of Time Series Data", IEEE Symposium on Information Visualization (INFOVIS '99), San Francisco, pp. 1-6 (Oct. 25-26, 1999).
Vanderplaats, Garret N., "Numerical Optimization Techniques for Engineering Design", Vanderplaats Research & Development (publisher), Third Edition, 18 pp. (1999).
Wang, Liang et al., "An Expert System for Forecasting Model Selection", IEEE, pp. 704-709 (1992).
Atuk, Oguz et al., "Seasonal Adjustment in Economic Time Series," Statistics Department, Discussion Paper No. 2002/1, Central Bank of the Republic of Turkey, Central Bank Review, 56 pp. (2002).
Babu, G., "Clustering in non-stationary environments using a clan-based evolutionary approach," Biological Cybernetics, Sep. 7, 1995, Springer Berlin I Heidelberg, pp. 367-374, vol. 73, Issue: 4.
Bruno, Giancarlo et al., "The Choice of Time Intervals in Seasonal Adjustment: A Heuristic Approach," Institute for Studies and Economic Analysis, Rome Italy, 14 pp. (2004).
Bruno, Giancarlo et al., "The Choice of Time Intervals in Seasonal Adjustment: Characterization and Tools," Institute for Studies and Economic Analysis, Rome, Italy, 21 pp. (Jul. 2001).
Bradley, D.C. et al., "Quantitation of measurement error with Optimal Segments: basis for adaptive time course smoothing," Am J Physiol Endocrinol Metab Jun. 1, 1993 264:(6) E902-E911.
Huang, N. E. et al., "Applications of Hilbert-Huang transform to non-stationary financial time series analysis." Appl. Stochastic Models Bus. Ind., 19: 245-268 (2003).
IBM, "IBM Systems, IBM PowerExecutive Installation and User's Guide," Version 2.10, 66 pp. (Aug. 2007).
Kalpakis, K. et al., "Distance measures for effective clustering of ARIMA time-series,"Data Mining, 2001. ICDM 2001, Proceedings IEEE International Conference on, vol., No., pp. 273-280, 2001.
Keogh, E. et al., "An online algorithm for segmenting time series," Data Mining, 2001. ICDM 2001, Proceedings IEEE International Conference on , vol., No., pp. 289-296, 2001.
Keogh, Eamonn et al., "Segmenting Time Series: A Survey and Novel Approach," Department of Information and Computer Science, University of California, Irvine, California 92697, 15 pp. (2004).
Palpanas, T. et al., "Online amnesic approximation of streaming time series," Data Engineering, 2004. Proceedings. 20th International Conference on , vol., No., pp. 339-349, Mar. 30-Apr. 2, 2004.
Wang Xiao-Ye; Wang Zheng-Ou; "A structure-adaptive piece-wise linear segments representation for time series," Information Reuse and Integration, 2004. IR I 2004. Proceedings of the 2004 IEEE International Conference on , vol., No., pp. 433-437, Nov. 8-10, 2004.
Yu, Lean et al., "Time Series Forecasting with Multiple Candidate Models: Selecting or Combining?" Journal of System Science and Complexity, vol. 18, No. 1, pp. 1-18 (Jan. 2005).
Non-Final Office Action dated Aug. 29, 2012 for U.S. Appl. No. 13/031,828, 17 pages.
Non-Final Office Action dated Oct. 31, 2007 for U.S. Appl. No. 10/402,849, 13 pages.
Final Office Action dated May 21, 2008 for U.S. Appl. No. 10/402,849, 19 pages.
Non-Final Office Action dated Feb. 20, 2009 for U.S. Appl. No. 10/402,849, 21 pages.
Final Office Action dated Jul. 1, 2010 for U.S. Appl. No. 10/402,849, 24 pages.
Non-Final Office Action dated Aug. 30, 2013 for U.S. Appl. No. 10/402,849, 26 pages.
Notice of Allowance dated Sep. 16, 2013 for U.S. Appl. No. 13/031,828 23 pages.
Non-Final Office Action dated Oct. 25, 2013 for U.S. Appl. No. 13/189,131, 26 pages.
Non-Final Office Action dated Jan. 16, 2014 for U.S. Appl. No. 13/440,045, 12 pages.
Non-Final Office Action dated Mar. 26, 2014 for U.S. Appl. No. 13/548,282, 29 pages.
Final Office Action dated Apr. 24, 2014 for U.S. Appl. No. 13/189,131, 29 pages.
Non-Final Office Action dated Aug. 8, 2014 for U.S. Appl. No. 10/402,849, 29 pages.
Notice of Allowance dated Aug. 29, 2014 for U.S. Appl. No. 13/440,045, 9 pages.
Final Office Action dated Oct. 24, 2014 for U.S. Appl. No. 13/548,282, 30 pages.
Notice of Allowance dated Jan. 14, 2015 for U.S. Appl. No. 13/551,647 8 pages.
Notice of Allowance dated Mar. 13, 2015 for U.S. Appl. No. 13/548,307, 9 pages.
Notice of Allowance dated May 8, 2015 for U.S. Appl. No. 13/786,838, 6 pagers.
Non-Final Office Action dated May 22, 2015 for U.S. Appl. No. 10/402,849, 32 pages.
Non-Final Office Action dated Aug. 17, 2015 for U.S. Appl. No. 13/189,131, 11 pages.
Notice of Allowance dated Sep. 29, 2015 for U.S. Appl. No. 13/548,282, 10 pages.
Final Office Action dated Nov. 17, 2015 for U.S. Appl. No. 10/402,849, 31 pages.
Non-Final Office Action dated Mar. 1, 2016 for U.S. Appl. No. 13/189,131, 6 pages.
First Action Interview Pilot Program Pre-Interview Communication dated Aug. 18, 2017, for U.S. Appl. No. 14/736,131, 5 pages.
Notice of Allowance dated Nov. 22, 2017 for U.S. Appl. No. 14/736,131, 11 pages.
Non-Final Office Action dated Nov. 14, 2016 for U.S. Appl. No. 15/146,697, 16 pages.
Final Office Action dated May 15, 2017 for U.S. Appl. No. 15/146,697, 18 pages.
Non-Final Office Action dated Dec. 7, 2017 for U.S. Appl. No. 15/146,697, 23 pages.
Notice of Allowance dated May 14, 2018 for U.S. Appl. No. 15/890,013, 10 pages.
Notice of Allowance dated May 15, 2018 for U.S. Appl. No. 15/890,019, 10 pages.

* cited by examiner

FIG. 12

PREDICTING AND ADJUSTING COMPUTER FUNCTIONALITY TO AVOID FAILURES

REFERENCE TO RELATED APPLICATION

This claims the benefit of priority under 35 U.S.C. § 119(e) to U.S. Provisional Patent Application No. 62/634,117, filed Feb. 22, 2018, the entirety of which is hereby incorporated by reference herein.

TECHNICAL FIELD

The present disclosure relates generally to diagnostic analysis of a computer. More specifically, but not by way of limitation, this disclosure relates to predicting and adjusting computer functionality to avoid failures.

BACKGROUND

Computers include various software and hardware components that are prone to failure. Such failures can temporarily or permanently affect the computer's performance and functional capabilities. For example, computer failures can result in lost or corrupted data, a reduced ability to process information, a reduced ability to store and retrieve data from memory, memory leaks, and other problems.

SUMMARY

One example of the present disclosure includes a system having a processing device and a memory device. The memory device can include instructions that are executable by the processing device for causing the processing device to perform one or more operations. The instructions can cause the processing device to receive prediction data representing a prediction, wherein the prediction data forms a time series that spans a future time-period. The instructions can cause the processing device to receive a plurality of files defining abnormal data-point patterns to be identified in the prediction data, wherein each file in the plurality of files includes customizable program-code for identifying a respective abnormal pattern of data-point values in the prediction data. The instructions can cause the processing device to automatically identify at least one abnormal data-point pattern in the prediction data by interpreting and executing the customizable program-code in the plurality of files. The instructions can cause the processing device to automatically determine an override process that corresponds to the at least one abnormal data-point pattern in response to identifying the at least one abnormal data-point pattern in the prediction data. The override process can be automatically determined using correlations between the abnormal data-point patterns and override processes. The override process can involve replacing a value of at least one data point in the prediction data with another value that is configured to mitigate an impact of the at least one abnormal data-point pattern on the prediction. The instructions can cause the processing device to automatically generate a corrected version of the prediction data in response to determining the override process. The corrected version of the prediction data can be generated by executing the override process. The instructions can cause the processing device to automatically adjust one or more computer parameters based on the corrected version of the prediction data.

Another example of the present disclosure includes a non-transitory computer-readable medium comprising program code that is executable by a processing device for causing the processing device to perform one or more operations. The program code can cause the processing device to receive prediction data representing a prediction, wherein the prediction data forms a time series that spans a future time-period. The program code can cause the processing device to receive a plurality of files defining abnormal data-point patterns to be identified in the prediction data, wherein each file in the plurality of files includes customizable program-code for identifying a respective abnormal pattern of data-point values in the prediction data. The program code can cause the processing device to automatically identify at least one abnormal data-point pattern in the prediction data by interpreting and executing the customizable program-code in the plurality of files. The program code can cause the processing device to automatically determine an override process that corresponds to the at least one abnormal data-point pattern in response to identifying the at least one abnormal data-point pattern in the prediction data. The override process can be automatically determined using correlations between the abnormal data-point patterns and override processes. The override process can involve replacing a value of at least one data point in the prediction data with another value that is configured to mitigate an impact of the at least one abnormal data-point pattern on the prediction. The program code can cause the processing device to automatically generate a corrected version of the prediction data in response to determining the override process. The corrected version of the prediction data can be generated by executing the override process. The program code can cause the processing device to automatically adjust one or more computer parameters based on the corrected version of the prediction data.

Yet another example of the present disclosure involves a method. The method can include receiving prediction data representing a prediction, wherein the prediction data forms a time series that spans a future time-period. The method can include receiving a plurality of files defining abnormal data-point patterns to be identified in the prediction data, wherein each file in the plurality of files includes customizable program-code for identifying a respective abnormal pattern of data-point values in the prediction data. The method can include automatically identifying at least one abnormal data-point pattern in the prediction data by interpreting and executing the customizable program-code in the plurality of files. The method can include automatically determining an override process that corresponds to the at least one abnormal data-point pattern in response to identifying the at least one abnormal data-point pattern in the prediction data. The override process can be automatically determined using correlations between the abnormal data-point patterns and override processes. The override process can involve replacing a value of at least one data point in the prediction data with another value that is configured to mitigate an impact of the at least one abnormal data-point pattern on the prediction data. The method can include automatically generating a corrected version of the prediction data in response to determining the override process. The corrected version of the prediction data can be generated by executing the override process. The method can include automatically adjusting one or more computer parameters based on the corrected version of the prediction data. Some or all of these operations can be implemented by a processing device.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The patent or application file contains at least one drawing executed in color. Copies of this patent or patent application publication with color drawings will be provided by the office upon request and payment of any necessary fee. The present disclosure is described in conjunction with the appended figures:

FIG. 12 is an example of customizable program-code according to some aspects.

Figure 1:
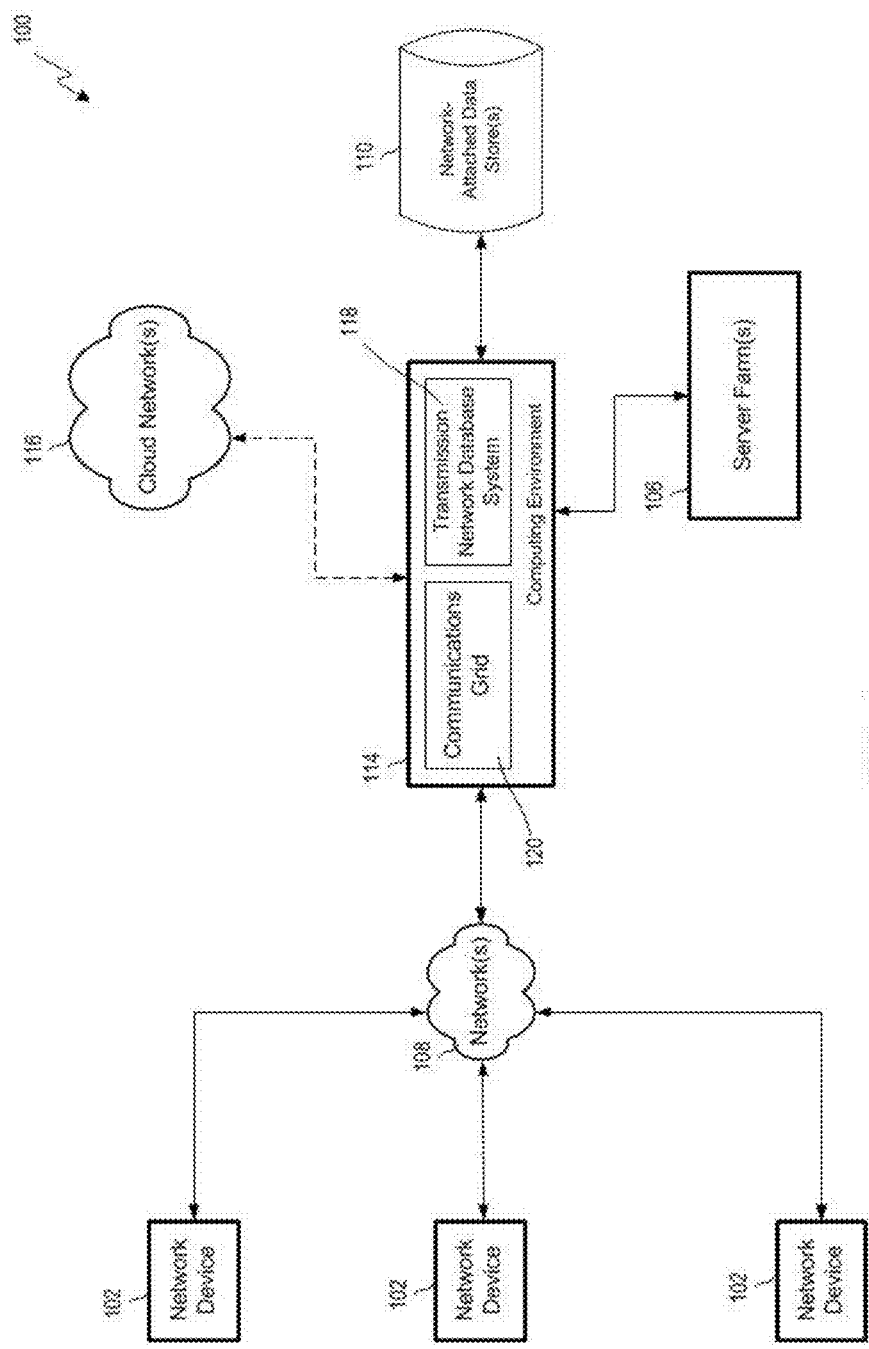
FIG. 1 is a block diagram of an example of the hardware components of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Computers include various software and hardware components that are prone to failure. Such failures can temporarily or permanently affect the computer's performance and functional capabilities. For example, computer failures can result in lost or corrupted data, a reduced ability to process information, a reduced ability to store and retrieve data from memory, memory leaks, and other problems. It is therefore desirable to avoid or reduce the impact of such failures in order to improve the computer's overall performance.

Some examples of the present disclosure can overcome one or more of the abovementioned problems via a monitoring system associated with a computer. The monitoring system can log various aspects of the computer's performance over a certain time period and then use the log to generate prediction data indicating how the computer will function during a future time-period. The prediction data is a time series representing a prediction of at least one aspect of how the computer will function during the future time-period. Since it can be challenging to accurately create the prediction data, the monitoring system can analyze the prediction data for various abnormal data-point patterns indicating errors in the prediction data. An abnormal data-point pattern is an abnormal pattern of data-point values. If an abnormal data-point pattern is identified, the monitoring system can execute one or more override processes to correct the prediction data. An override process is a process by which a value of a data point in the prediction data is replaced with a new value in order to mitigate the effect of the abnormal data-point pattern on the prediction data. After correcting the prediction data, the monitoring system can analyze the corrected prediction data to identify one or more anomalies therein. An anomaly is a data-point value or a pattern of data-point values associated with a computer failure. If the monitoring system identifies an anomaly, the monitoring system can adjust one or more parameters (e.g., hardware or software parameters) of the computer. This may involve preemptively performing maintenance, updates, or other operations to avoid or reduce the impact of the computer failure associated with the anomaly. The monitoring system can perform some or all of these operations automatically (e.g., with little or no human involvement).

More specifically, the monitoring system can include a preprogrammed set of abnormal data-point patterns to search for in the prediction data. Examples of the abnormal data-point patterns can include (i) a positive flat pattern in which all of the data-points in the prediction data have values that are equal and positive; (ii) an improper inactivity pattern in which the prediction data has inactivity (e.g., data points with values of zero) during a time period in which a historical dataset that was used to create the prediction data had activity (e.g., data points with non-zero values); (iii) an extreme pattern in which the an average value of the data points in the prediction data is at least a threshold amount above or below a historical average during the same time period in the historical dataset used to create the prediction data; or (iv) any combination of these. In other examples, the monitoring system can enable a user to define an abnormal data-point pattern using program code or a graphical user interface. For example, the user can create a file with program code defining one or more abnormal data-point patterns in a format that is consumable by the monitoring system. The monitoring system can receive the file and execute the program code therein to identify the abnormal data-point patterns in the prediction data.

In some examples, a community of users and developers can contribute files defining abnormal data-point patterns to a repository. The monitoring system can access (e.g., automatically or at the user's direction) the repository, download some or all of the files, and configure the files for consumption and execution by the monitoring system. In this manner, the monitoring system's capability to search for and correct abnormal data-point patterns in the prediction data can be manually customized or automatically updated, for example, to help ensure that the prediction data is as accurate as possible.

Similarly to the above, in some examples the monitoring system can include a preprogrammed set of anomalies associated with computer failures to search for in the prediction data. Alternatively, the monitoring system can enable a user to define an anomaly associated with a computer failure using program code or a graphical user interface. For example, the user can create a file with program code defining one or more anomalies in a format that is consumable by the monitoring system. The monitoring system can receive the file and execute the program code therein to identify the anomalies in the prediction data.

In some examples, a community of users and developers can contribute files defining anomalies associated with computer failures to a repository. The monitoring system can access (e.g., automatically or at the user's direction) the repository, download some or all of the files, and configure the files for consumption and execution by the monitoring system. In this manner, monitoring system's capability to search for anomalies and avoid computer failures associated with such anomalies can be manually customized or automatically updated, for example, to avoid newly identified computer-failures.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-10 depict examples of systems and methods usable for predicting and adjusting computer functionality according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that, in some examples, can collectively be referred to as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for predicting and adjusting computer functionality, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for predicting and adjusting computer functionality to a network-attached data store 110 for storage. The computing environment 114 may later retrieve the data from the network-attached data store 110 and use the data to predict and adjust computer functionality.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for predicting and adjusting computer functionality.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for predicting and adjusting computer functionality. For example, the computing environment 114, a network device 102, or both can implement one or more versions of the processes discussed with respect to any of the figures.

Figure 2:
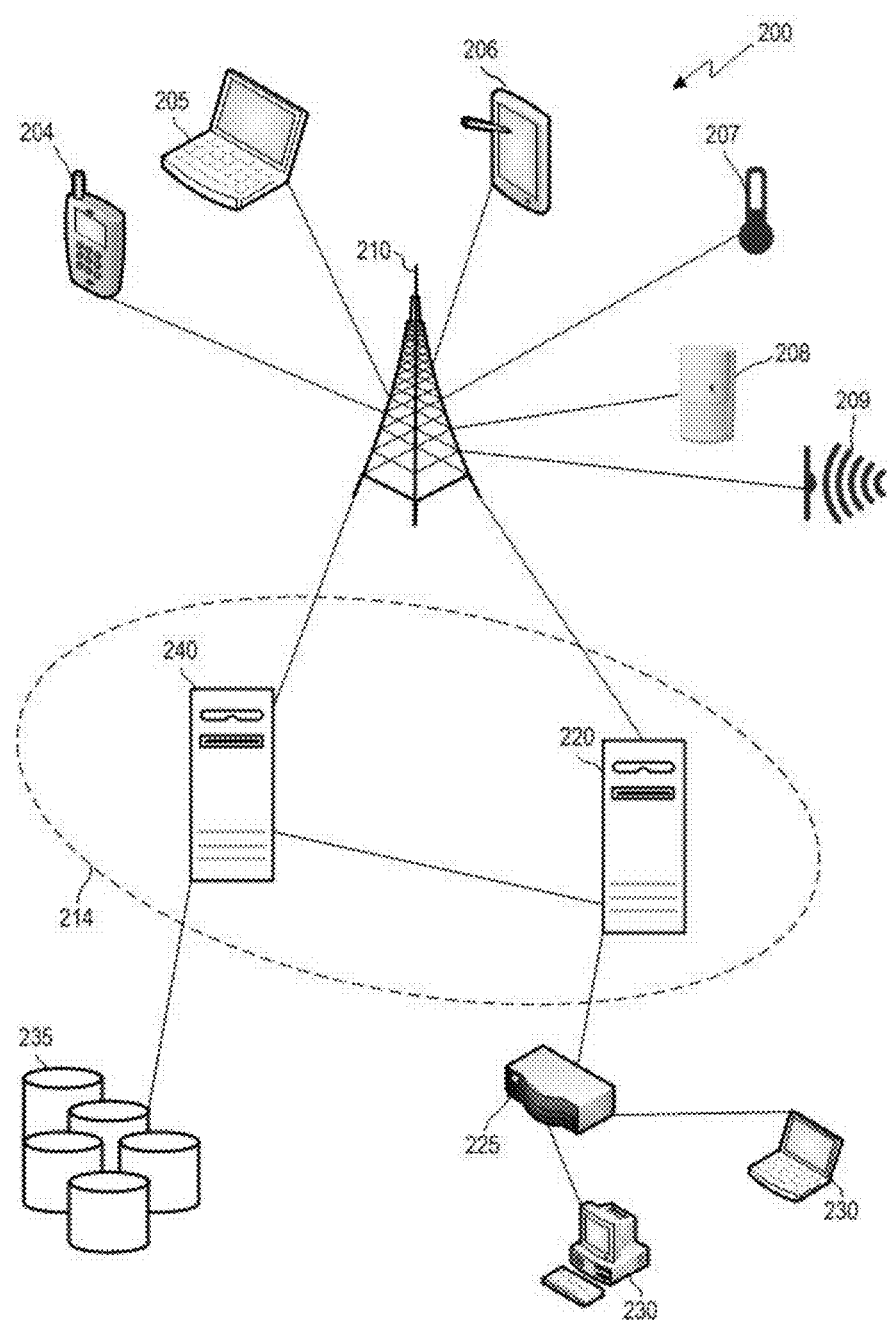
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to predict and adjust computer functionality).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which computer functionality is predicted and adjusted via data, the computing environment 214 can perform a pre-analysis of the data. The pre-analysis can include determining whether the data is in a correct format for predicting and adjusting computer functionality using the data and, if not, reformatting the data into the correct format.

Figure 3:
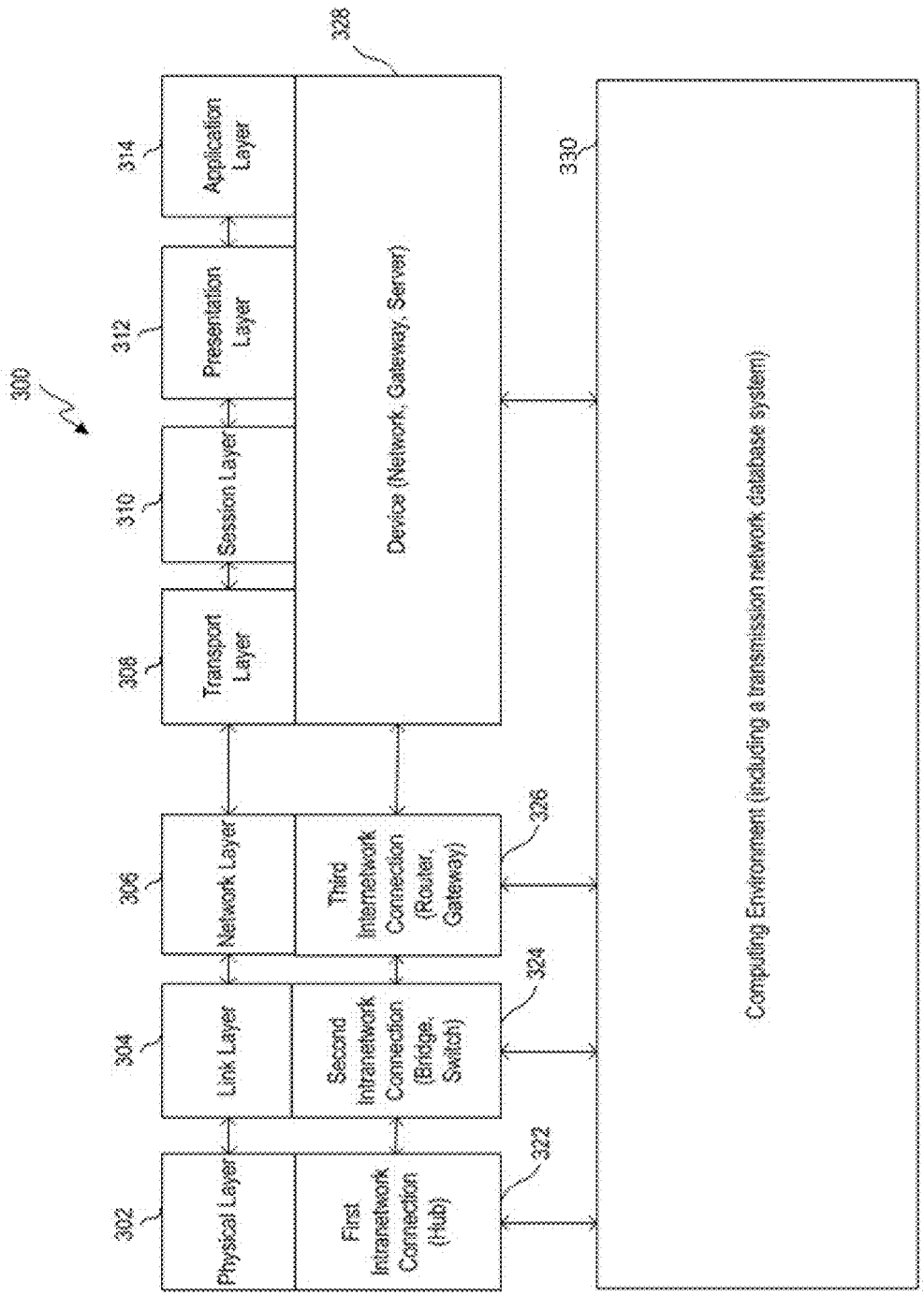
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for predicting and adjusting computer functionality, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for predicting and adjusting computer functionality.

Figure 4:
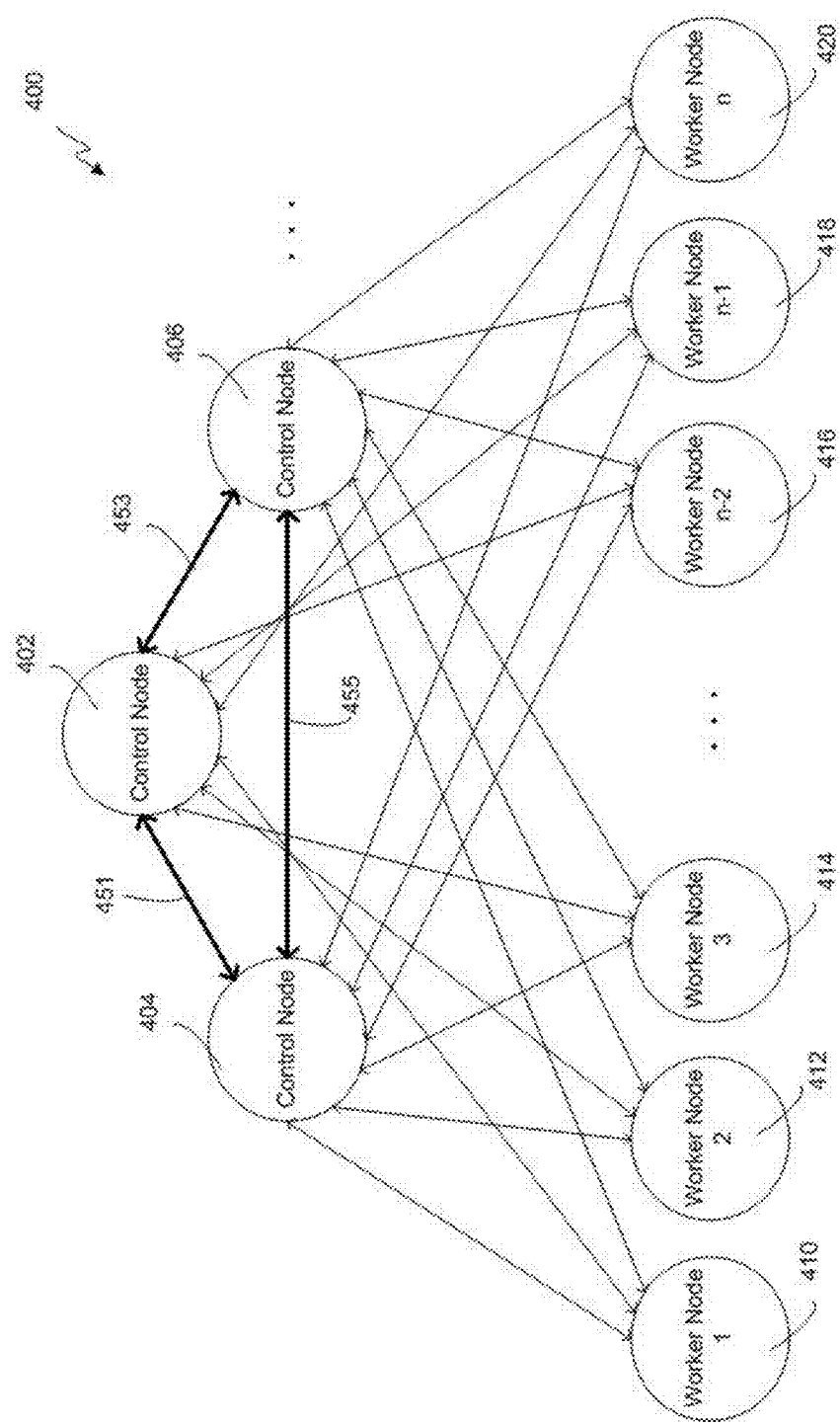
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to predicting and adjusting computer functionality. The project may include the data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for predicting and adjusting computer functionality can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may predict and adjust computer functionality using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to predict and adjust computer functionality.

Figure 5:
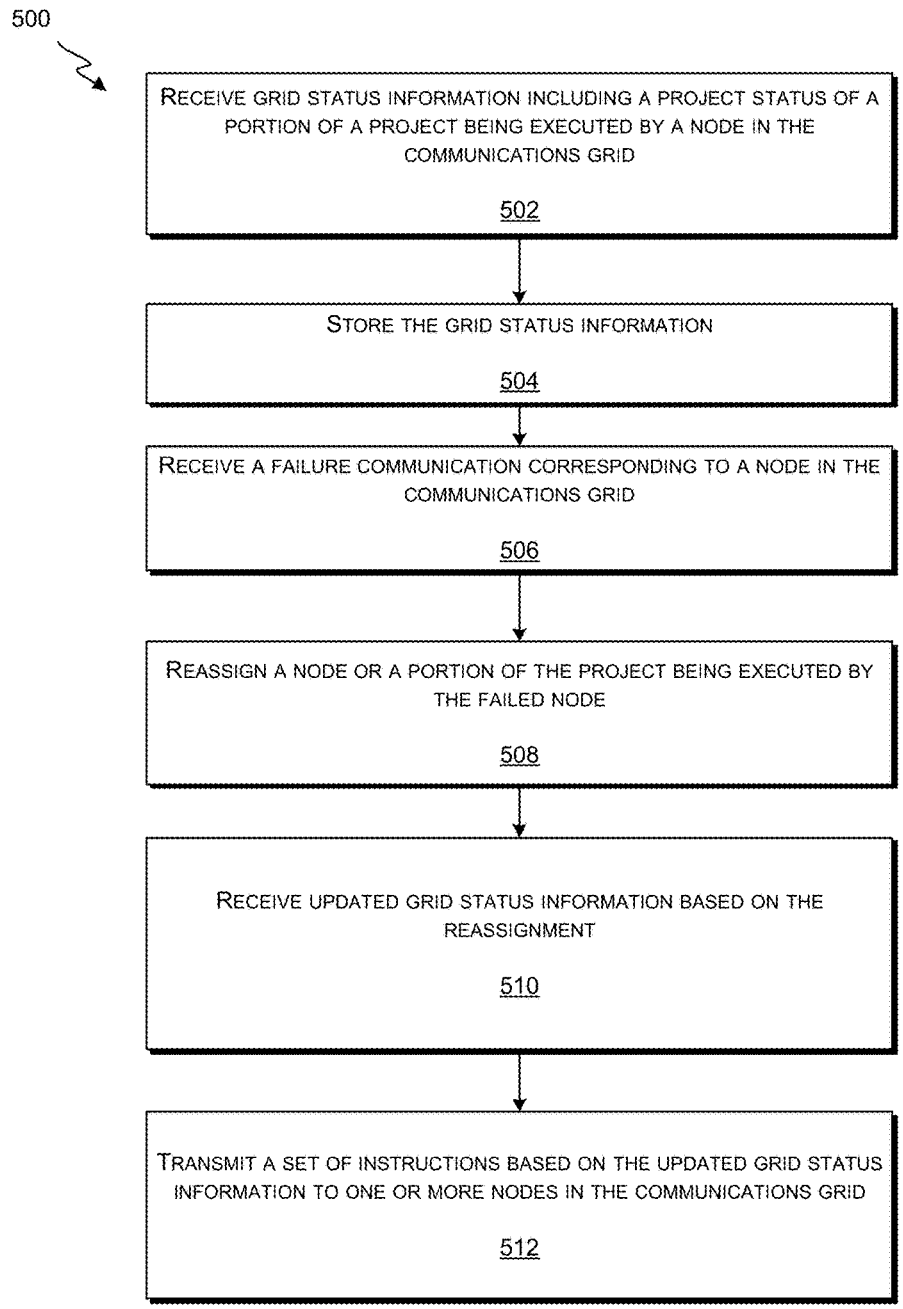
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
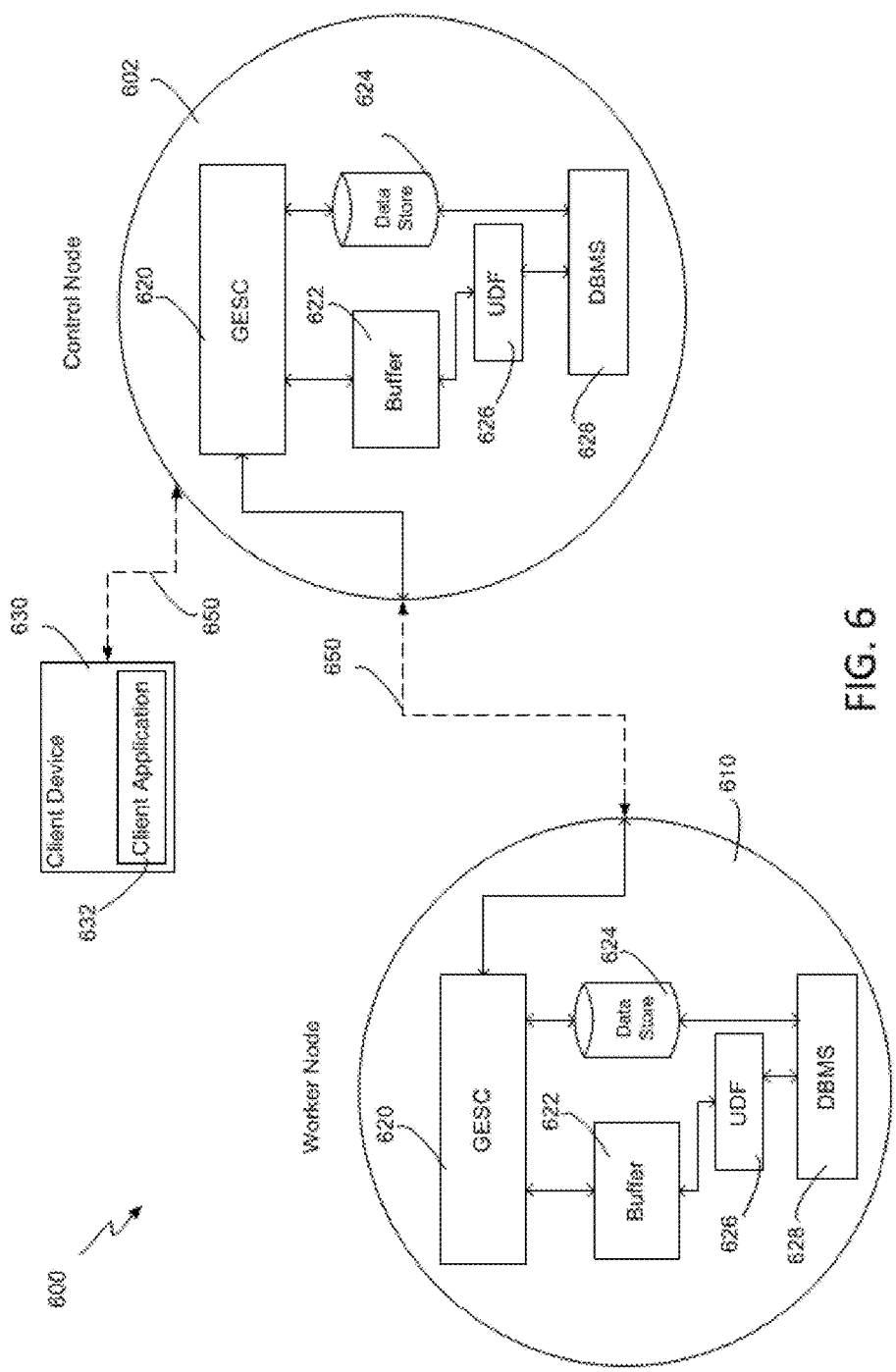
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
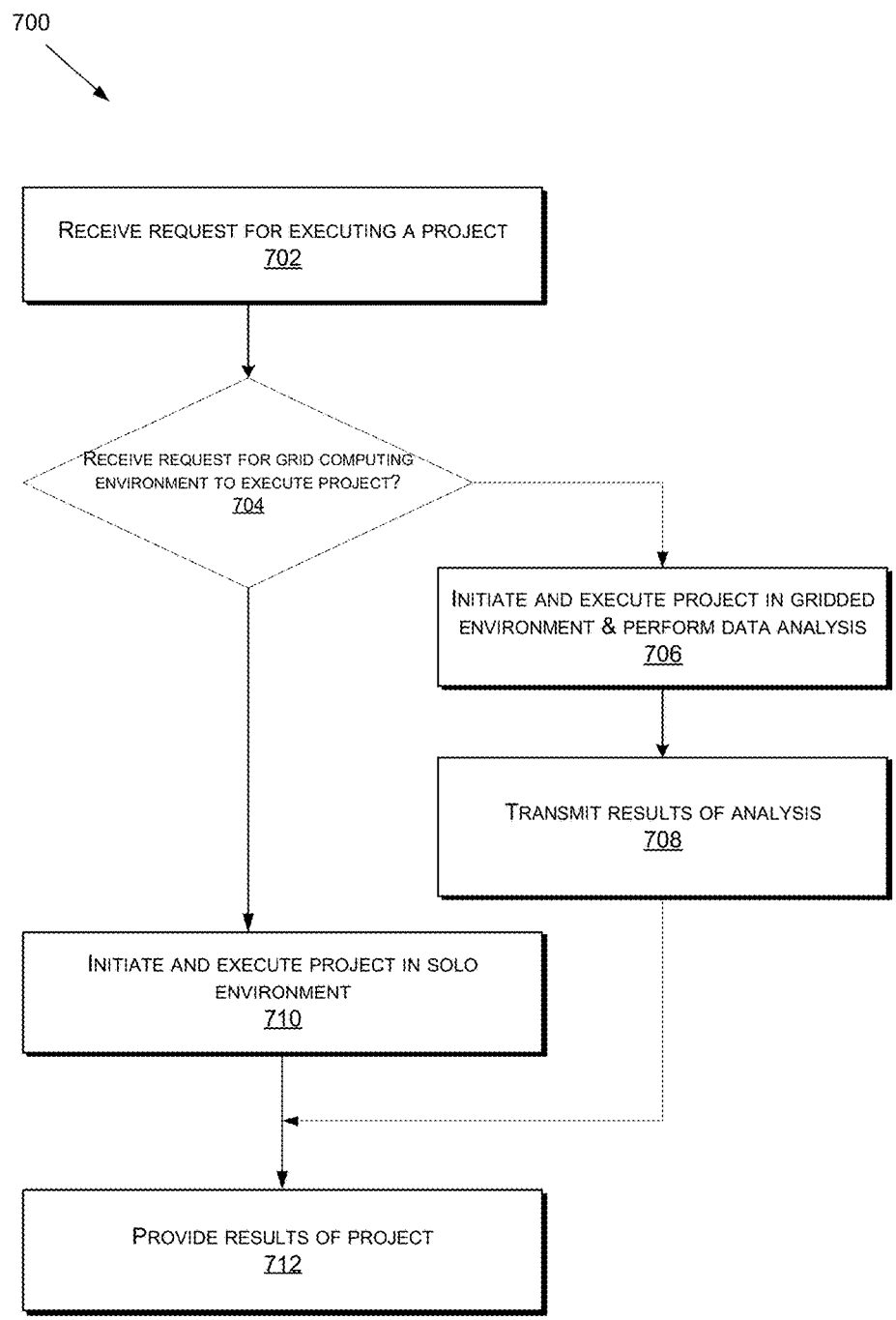
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
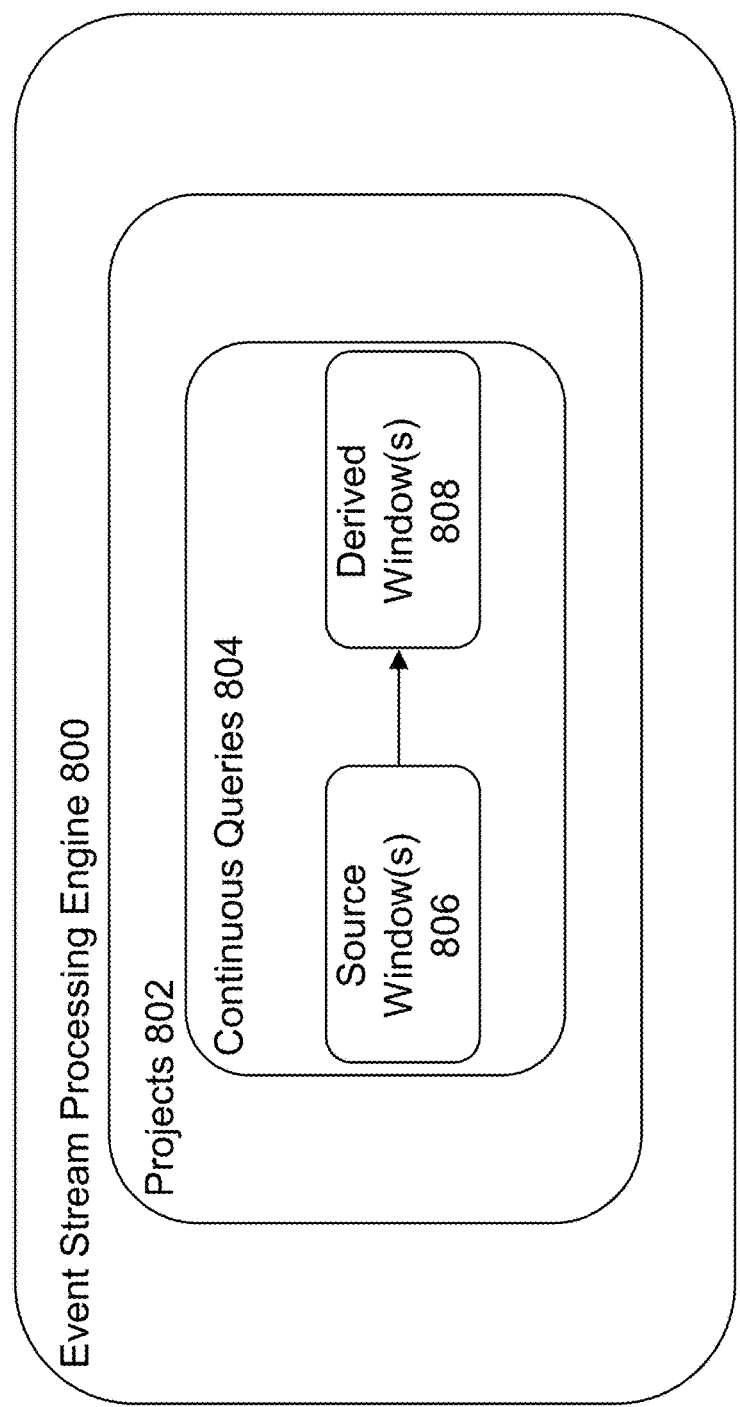
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802.

In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
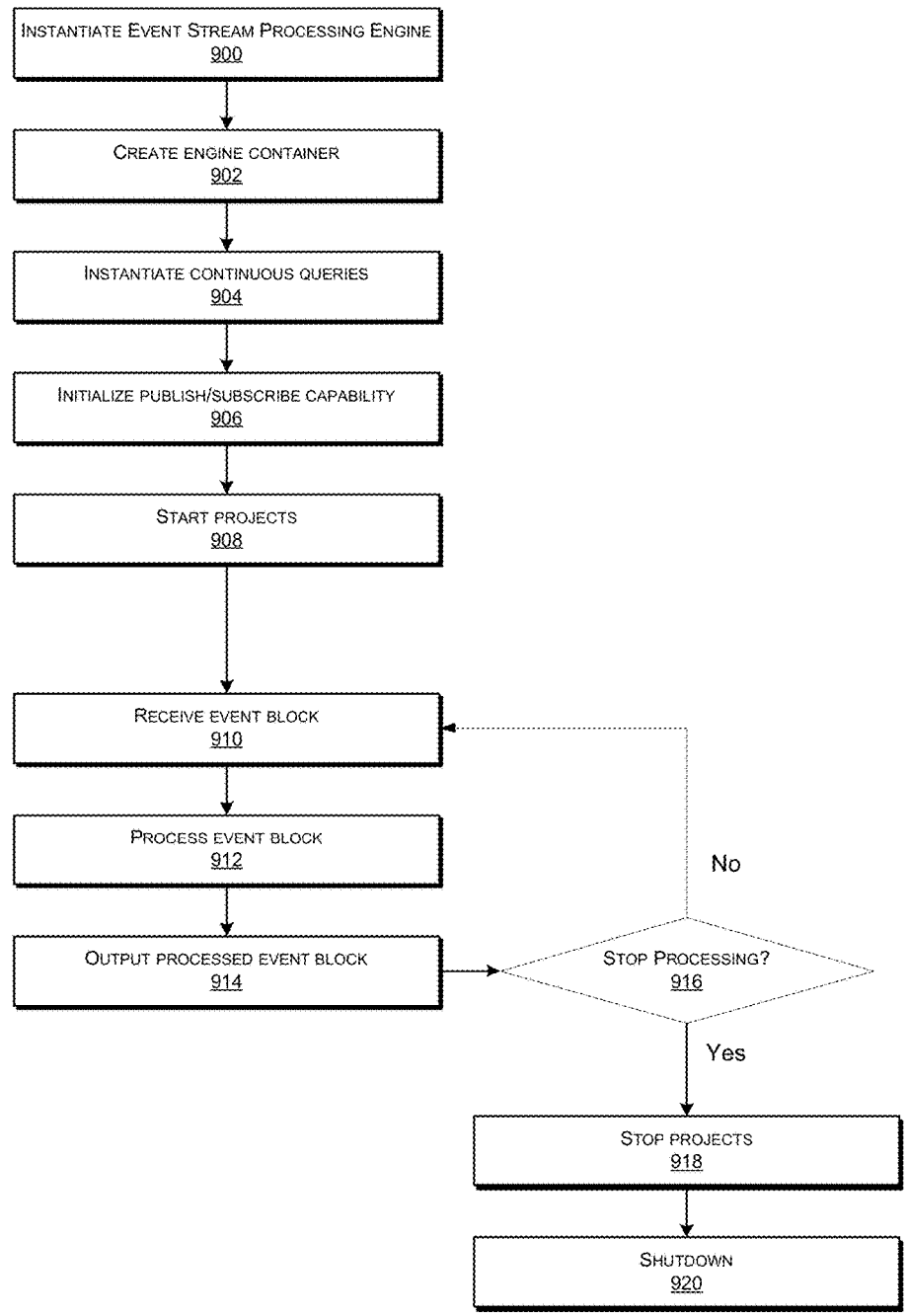
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
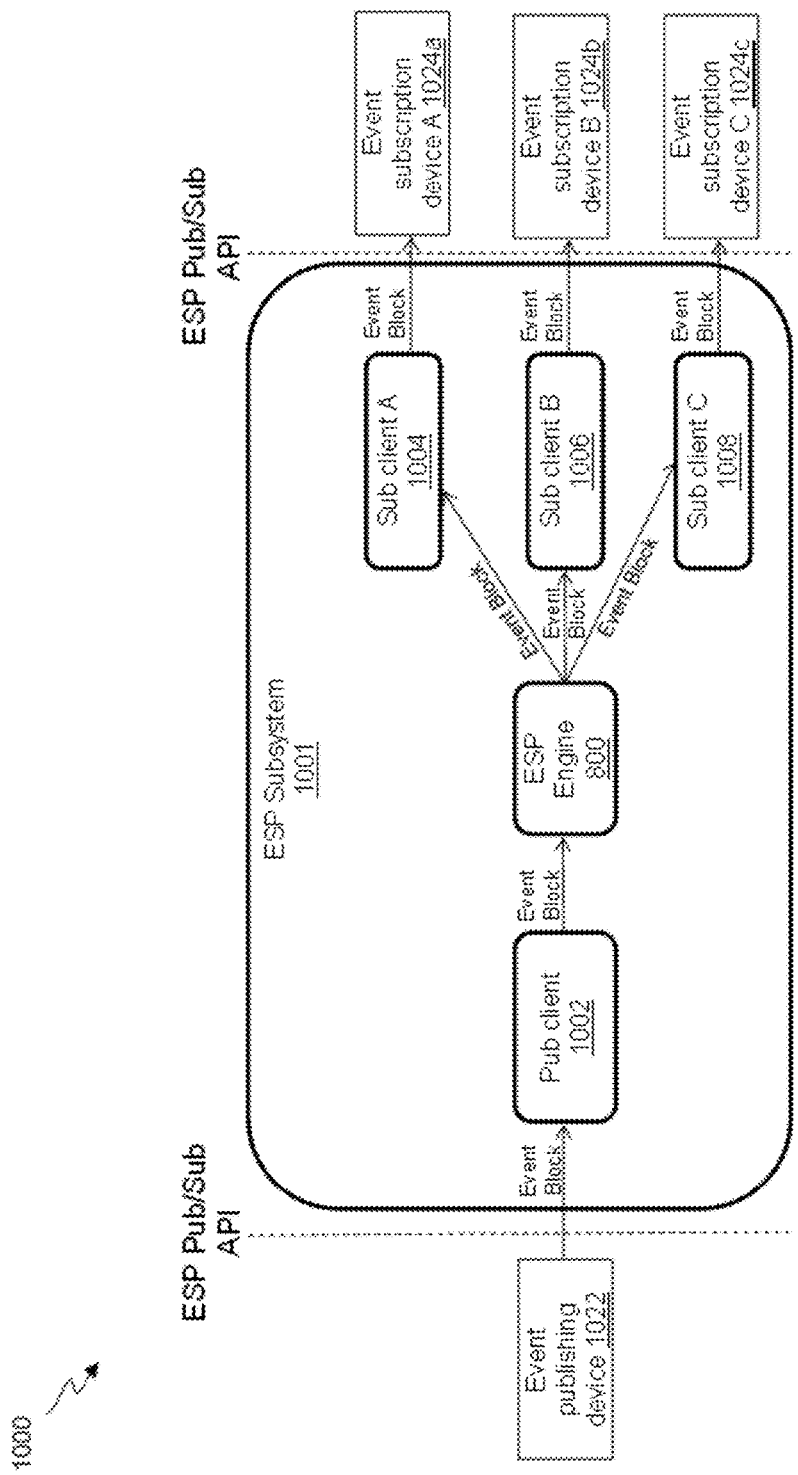
FIG. 10 is a block diagram of an ESP system interfacing between a publishing device and multiple event subscribing devices according to some aspects.

FIG. 10 is a block diagram of an ESP system 1000 interfacing between publishing device 1022 and event subscription devices 1024*a-c* according to some aspects. ESP system 1000 may include ESP subsystem 1001, publishing device 1022, an event subscription device A 1024*a*, an event subscription device B 1024*b*, and an event subscription device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024*a*, event subscription device B 1024*b*, and event subscription device C 1024*c*. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024*a*, event subscription device B 1024*b*, and event subscription device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024*a*, event subscription device B 1024*b*, and event subscription device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024*a* using the publish/subscribe API. Subscribing client B 1006 may be started by an event subscription application B executing at event subscription device B 1024*b* using the publish/subscribe API. Subscribing client C 1008 may be started by an event subscription application C executing at event subscription device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
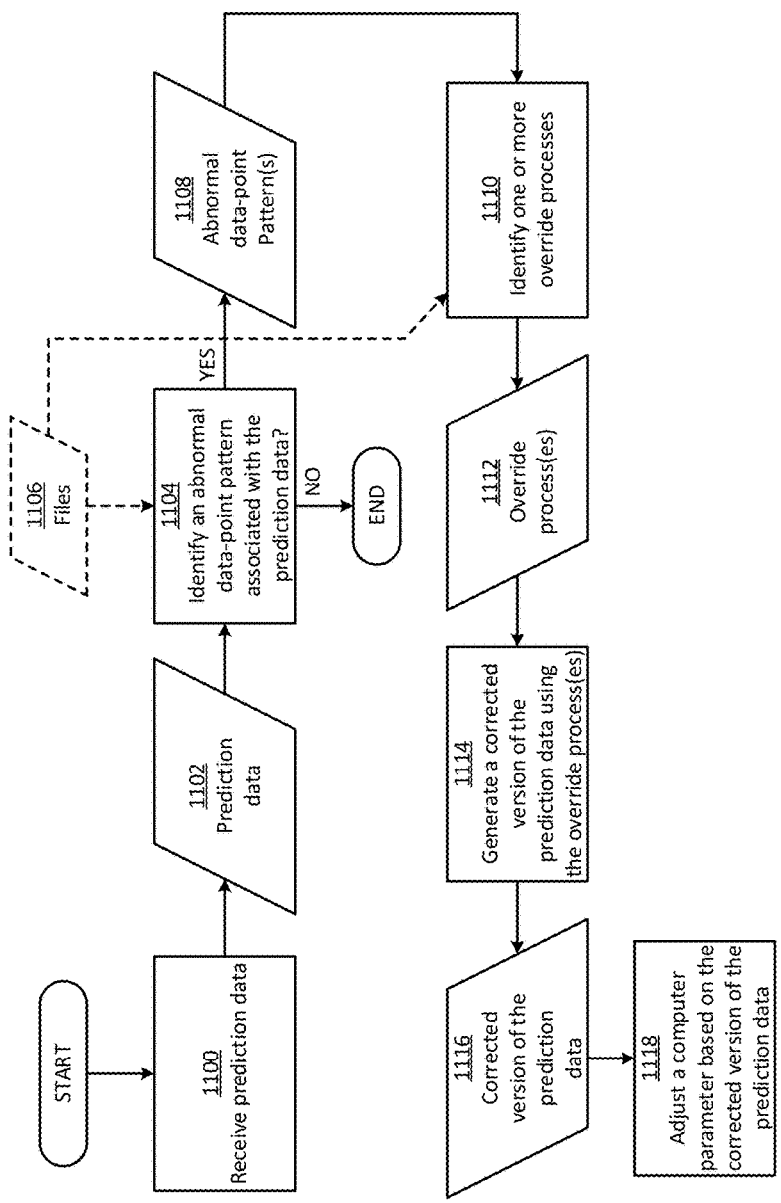
FIG. 11 is a flow chart of an example of a process for predicting and adjusting computer functionality according to some aspects.

FIG. 11 flow chart of an example of a process for predicting and adjusting computer functionality according to some aspects. Some examples can include more operations than, fewer operations than, different operations than, or a different order of the operations shown in FIG. 11. Some examples can be implemented using any of the systems and processes described with respect to FIGS. 1-10.

In block 1100, a processing device (e.g., of a monitoring system) receives prediction data 1102. The prediction data 1102 is a time series with data points spanning a future time-period. The prediction data 1102 represents a prediction over the future-time period. Receiving the prediction data 1102 can involve obtaining the prediction data 1102 from a remote computing device, such as a server or a client device; obtaining the prediction data 1102 from a database; or generating the prediction data 1102.

The prediction data 1102 is created from a historical dataset. The historical dataset includes one or more time series spanning a prior time period. A predictive technique can be applied to the historical dataset to generate the prediction data 1102. One example of a predictive technique involves applying a model to the historical dataset. Non-limiting examples of the model can include an autoregressive integrated moving average (ARIMA) model, an ARIMA model with exogenous variables (ARIMAX), an unobserved component model (UCM), an exponential smoothing model (ESM), or any combination of these.

In some examples, the prediction data 1102 indicates how a device (e.g., a computer) will function during a future time-period. To generate the prediction data 1102, a predictive technique can be applied to a historical dataset, whereby the historical dataset indicates various aspects of how the device operated during a prior time-period. For example, the historical dataset can indicate the device's processor usage, memory consumption, latency, bandwidth consumption, software execution patterns, memory access patterns, temperature, power consumption, or any combination of these, during the prior time-period. The historical dataset can be gathered by sensors or computers coupled to the device.

In other examples, the prediction data 1102 indicates future demand for an item or future production of an item. For example, the prediction data 1102 can represent a prediction of how many times computer software will be downloaded during a future time-period. As another example, the prediction data 1102 can represent a prediction of how many times a product will be purchased during a future time-period. As yet another example, the prediction data 1102 can represent a prediction of how much of an item will be manufactured during a future time-period. As still another example, the prediction data 1102 can represent a prediction of how many times digital content will be streamed during a future-time period.

In still other examples, the prediction data 1102 indicates future consumption of a resource. For example, the prediction data 1102 can represent a prediction of how much electrical power will be consumed during a future time-period. As another example, the prediction data 1102 can represent a prediction of how much water or food will be consumed during a future time-period. As yet another example, the prediction data 1102 can represent a prediction of how much processing power or memory will be consumed by one or more devices during a future time-period.

Often, the prediction data 1102 will have errors due to a variety of issues with the historical dataset (e.g., its format, size, or length) and the predictive technique used. It can be desirable to eliminate these errors before relying on the prediction data 1102.

In block 1104, the processing device determines if the prediction data 1102 has at least one abnormal data-point pattern 1108. In some examples, the processing device can receive one or more files 1106 usable for identifying the abnormal data-point pattern(s) 1108 in the prediction data 1102. Each file can include program code defining one or more abnormal data-point patterns to be detected in the prediction data 1102. The processing device can interpret and/or execute the program code in each file to identify an abnormal data-point pattern(s) 1108 in the prediction data 1102.

One example of the program code is shown in FIG. 12. Referring now to FIG. 12, the program code includes a function configured to receive certain input parameters and provide a certain output. In this example, the function is named "userfunc1" and can receive the input parameters: actual (e.g., the historical data), predict (e.g., the prediction), seasonality, fcstHorizon, sign, and fuzzyfactor. The function can use these inputs to calculate a minimum value and a maximum value of the prediction data, identify whether the prediction data has a flat pattern and, if so, identify what type of flat pattern is present in the prediction data. A flat pattern can occur when a certain number of consecutive data points have equal values. The function can then output a value of 0 to indicate that the flat pattern is not present or a value of 1 to indicate that the flat pattern is present in the prediction data. One or more users can create any number and combination of files with program code defining functions to be executed by the processing device to identify abnormal data-point patterns in the prediction data 1102, thereby providing customizability.

Figure 13:
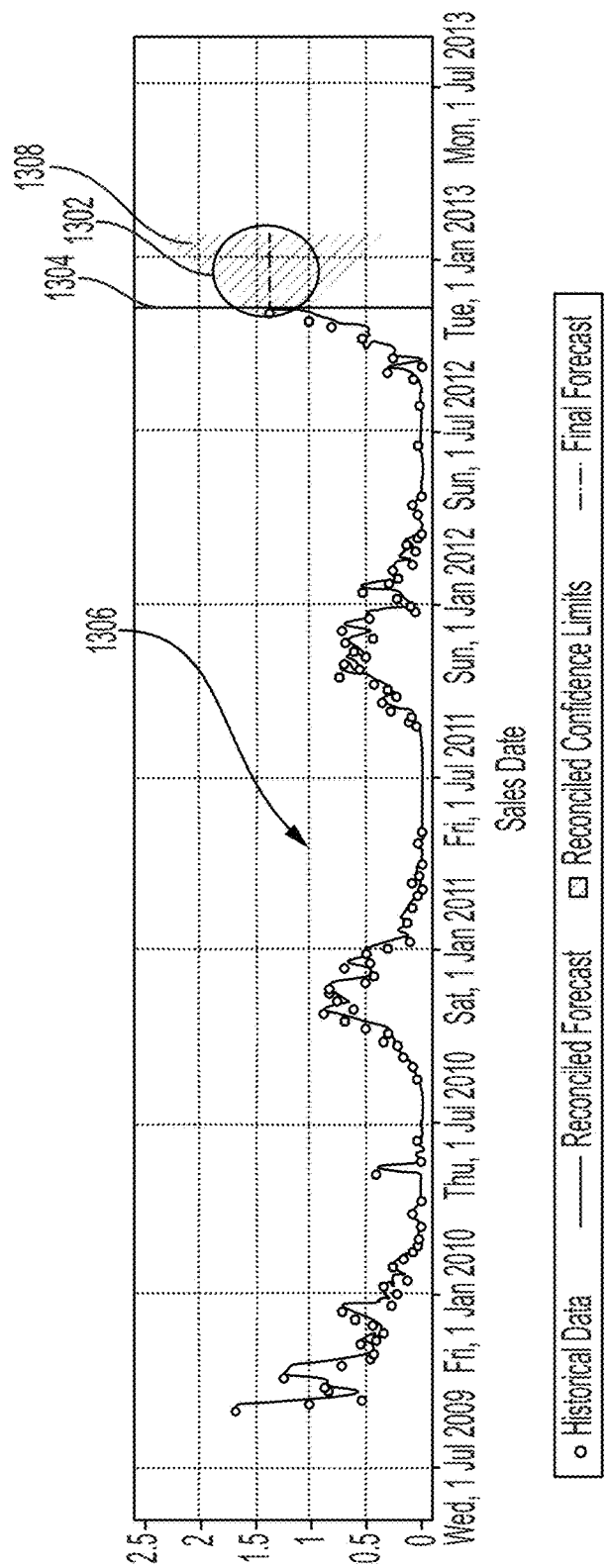
FIG. 13 is a graph of an example of a positive flat time-series according to some aspects.

The processing device may use preprogrammed rules to identify the abnormal data-point pattern 1108. For example, the processing device can use rules specifying that the processing device is to search for a positive flat pattern in the prediction data 1102. One example of a positive flat pattern is shown in shown in circle 1302 of FIG. 13. The data points 1306 to the left of the vertical line 1304 depict the historical dataset used to generate prediction data. The data points to the right of the vertical line 1304 (shown to the circle 1302) are the prediction data. The shaded area 1308 surrounding the prediction data represents confidence limits corresponding to the prediction data. In one such example, the historical dataset can represent processing-power consumption over time and the prediction data can represent a prediction of processing-power consumption over a future time-period. Because the prediction data has a positive flat pattern, while the historical dataset has varying activity, the processing device may determine that the prediction data has an abnormal data-point pattern.

Additionally or alternatively, the processing device can use rules specifying that the processing device is to search for an improper inactivity pattern in the prediction data 1102. In one such example, the processing device can identify a historical dataset that was used to generate the prediction data 1102. The historical dataset may represent a pattern of software activity during a prior time period. The processing device can analyze the historical dataset to determine that there was activity during a time period between Jan. 1, 2016 and Jan. 9, 2016, while the prediction data 1102 predicts that there will be inactivity been January 1 and January 9 of a future year (e.g., 2019). As a result, the processing device can determine that the prediction data 1102 has an abnormal data-point pattern.

Additionally or alternatively, the processing device can use rules specifying that the processing device is to search for an extreme pattern in the prediction data 1102. In one such example, the processing device can identify a historical dataset that was used to generate the prediction data 1102. The historical dataset may represent a pattern of bandwidth consumption during a prior time period. The processing device can analyze the historical dataset to determine an average value of its data points—e.g., that there was an average bandwidth consumption of 2 Gigabytes (GB) during the prior time period. The processing device can compare the average value corresponding to the historical dataset with another average value of the data points in the prediction data 1102 (e.g., 2.5 GB) to determine a difference between the two. If the difference exceeds a predefined threshold amount (e.g., 200 MB), the processing device can determine that the prediction data 1102 has an abnormal data-point pattern.

While comparing the prediction data 1102 to a corresponding historical dataset can be useful for identifying potential problems in the prediction data 1102, it may also be useful to analyze characteristics of the historical dataset. So, in some examples, the processing device can additionally or alternatively analyze the historical dataset. The processing device can analyze the historical dataset for one or more abnormal data-point patterns, which may signal that the prediction data 1102 derived from the historical dataset is unreliable.

Figure 14:
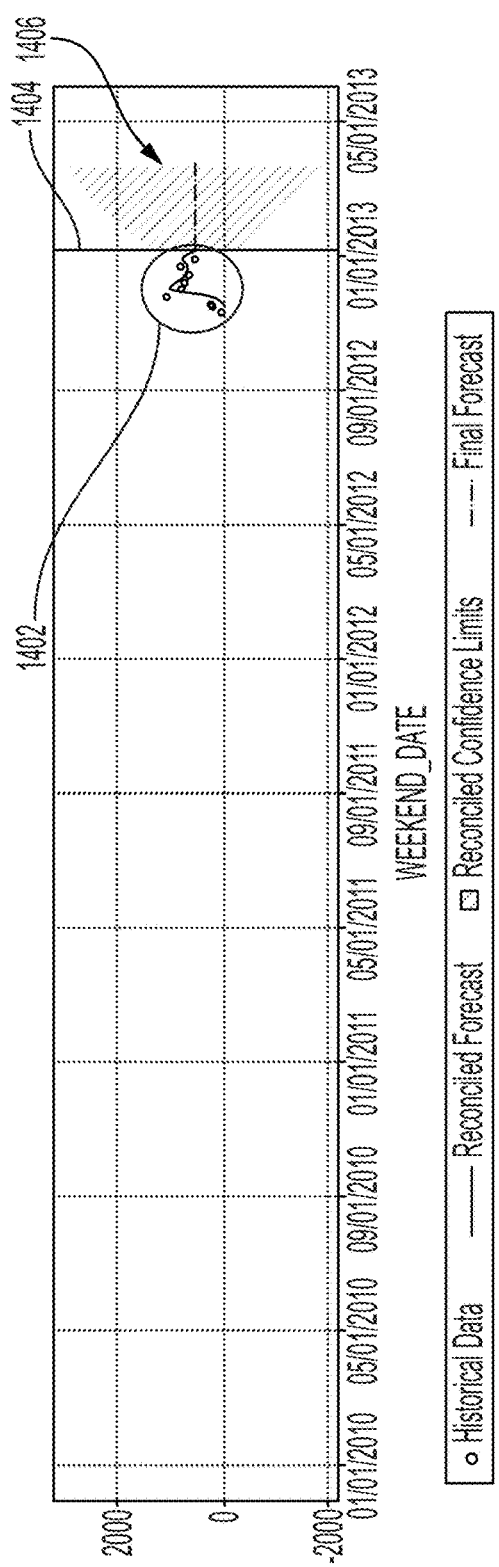
FIG. 14 is a graph of an example of a short time series according to some aspects.

For example, the processing device can use preprogrammed rules or files 1106 to analyze the historical dataset for the abnormal data-point patterns. In one such example, the processing device can analyze the historical dataset to determine that the historical dataset includes a time series that is less than a threshold length (e.g., a threshold number of data points). Such a time series can be referred to as a short time series, and may have an insufficient amount of data from which to generate a reliable prediction. One example of a short time series is shown in FIG. 14, with circle 1402 encompassing the historical dataset. Since there is a small amount of data within the historical dataset, the resulting prediction data 1406 shown to the right of the vertical line 1404 is flat and likely inaccurate.

Figure 15:
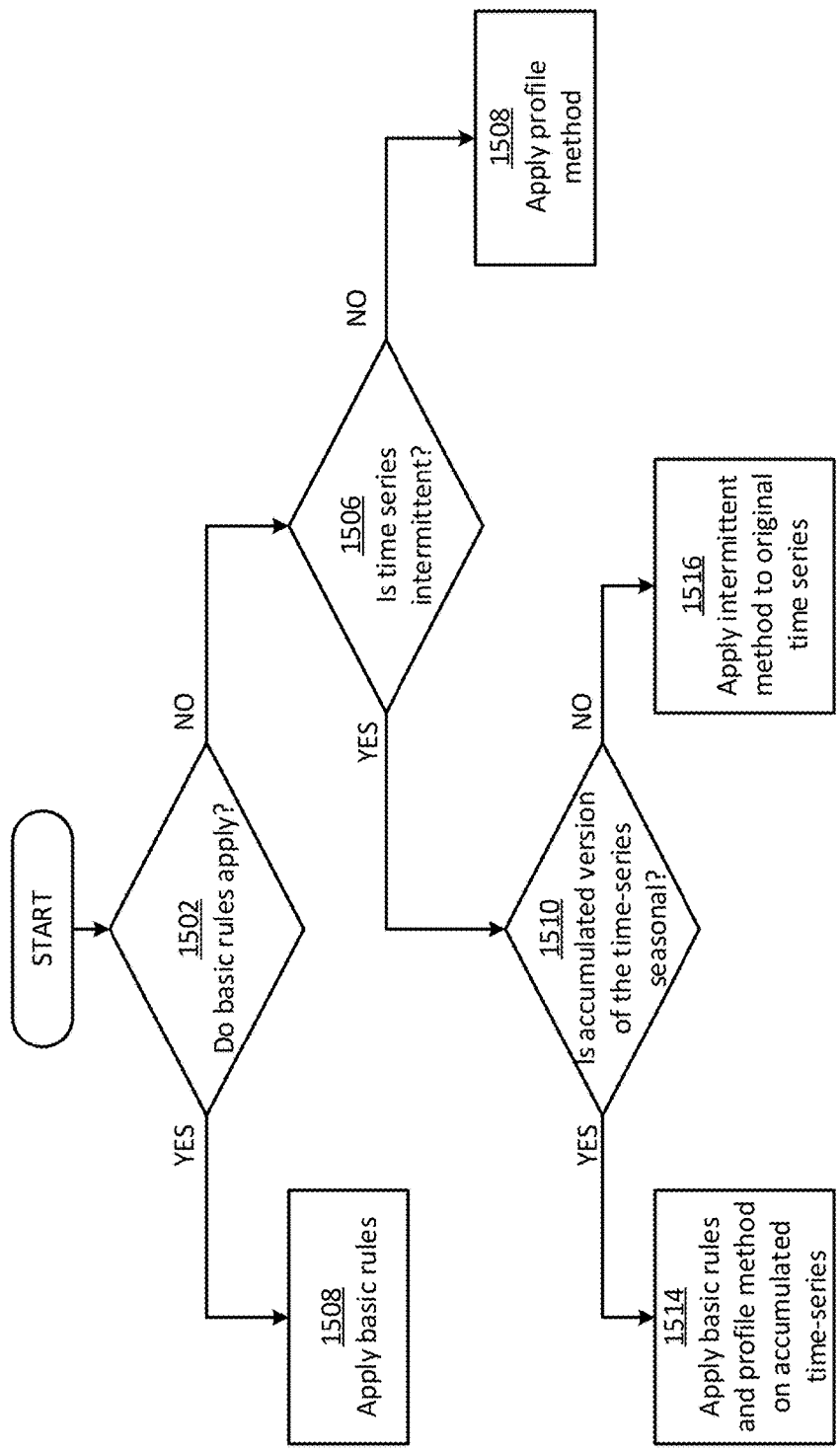
FIG. 15 is a flow chart of an example of a process for identifying a retired or inactive time series according to some aspects.

Other examples can involve the processing device searching the historical dataset for other types of abnormal data-point patterns, such as data-point patterns indicating that the historical dataset includes an inactive (e.g., retried) time series. One example of a process for determining whether a time series is inactive is shown in FIG. 15 and described below. But other examples can include more operations than, fewer operations than, different operations than, or a different order of the operations shown in FIG. 15.

Referring now to FIG. 15, in block 1502, the processing device analyzes a time series in the historical dataset to determine if a set of basic rules apply to the time series. The basic rules are a series of conditions that enable the processing device to immediately determine whether the time series is active or inactive, without having to perform a deeper analysis. Below are some examples of the basic rules:

If the time series has no consecutive zeros (e.g., consecutive data points with values of zero) at the end, then the time series is active. In one such example, a time series representing memory consumption may not have any consecutive zeros at the end, which may indicate that the processor is still actively using the computer memory to perform tasks. This, in turn, may indicate that the memory and/or processor is properly functioning.

If the time series has more than a season's (e.g., one year's) worth of consecutive zeros, then the time series is inactive. In one such example, a time series representing memory consumption may have consecutive zeros for more than one week, which may indicate that the processor has not actively used the computer memory to perform tasks for a while. This, in turn, may indicate a problem with the memory and/or processor.

If the time series only has data points with values of zero, then the time series is inactive. In one such example, a time series representing memory consumption may only have zeros, which may indicate that the memory has never been used. This, in turn, may indicate a problem with the memory and/or processor.

If there is insufficient data in the time series to make a determination of whether the time series is active or inactive, then treat the time series as active. In one such example, a time series representing memory consumption may be too short to make a determination of whether it is active or inactive. So, the time series can be treated as active by default.

The processing device can determine whether the basic rules apply to the time series by analyzing the characteristics (e.g., length, data-point values, etc.) of the time series. If the processing device determines that the basic rules apply to the time series, the process can proceed to block 1508, where the processing device can apply the basic rules to the time series to determine whether the time series is active or inactive.

If the processing device determines that the basic rules do not apply to the time series, the process can proceed to block 1506, where the processing device can determine if the time series is intermittent. An intermittent time series is a time series in which there are several time-intervals with data points having values of zeros. As one particular example, an intermittent time series can represent demand for software that is ending its life cycle and for which there are sporadic periods with no downloads.

Figure 18:
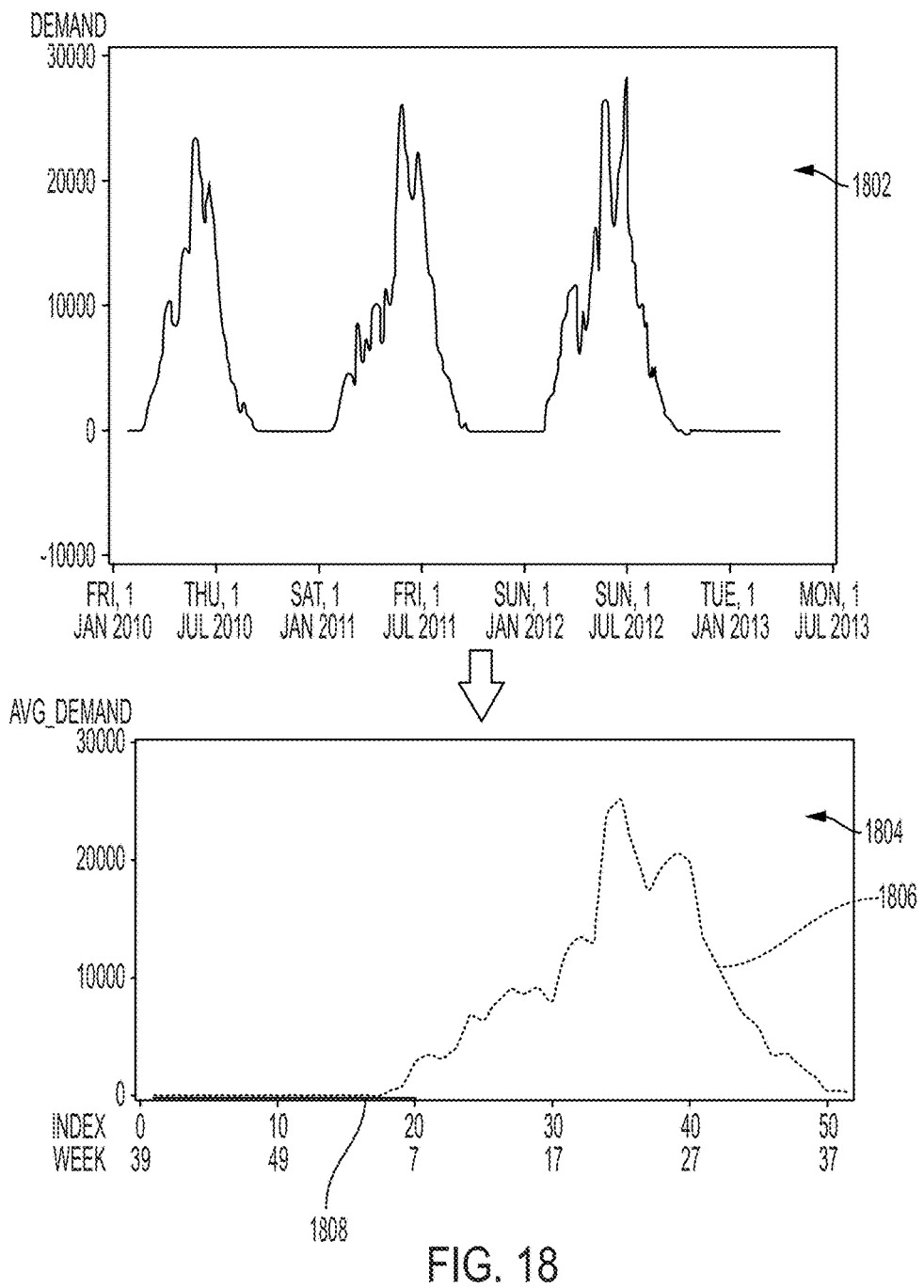
FIG. 18 depicts graphs showing an example of a profile method for identifying retired or inactive time series according to some aspects.
Figure 19:
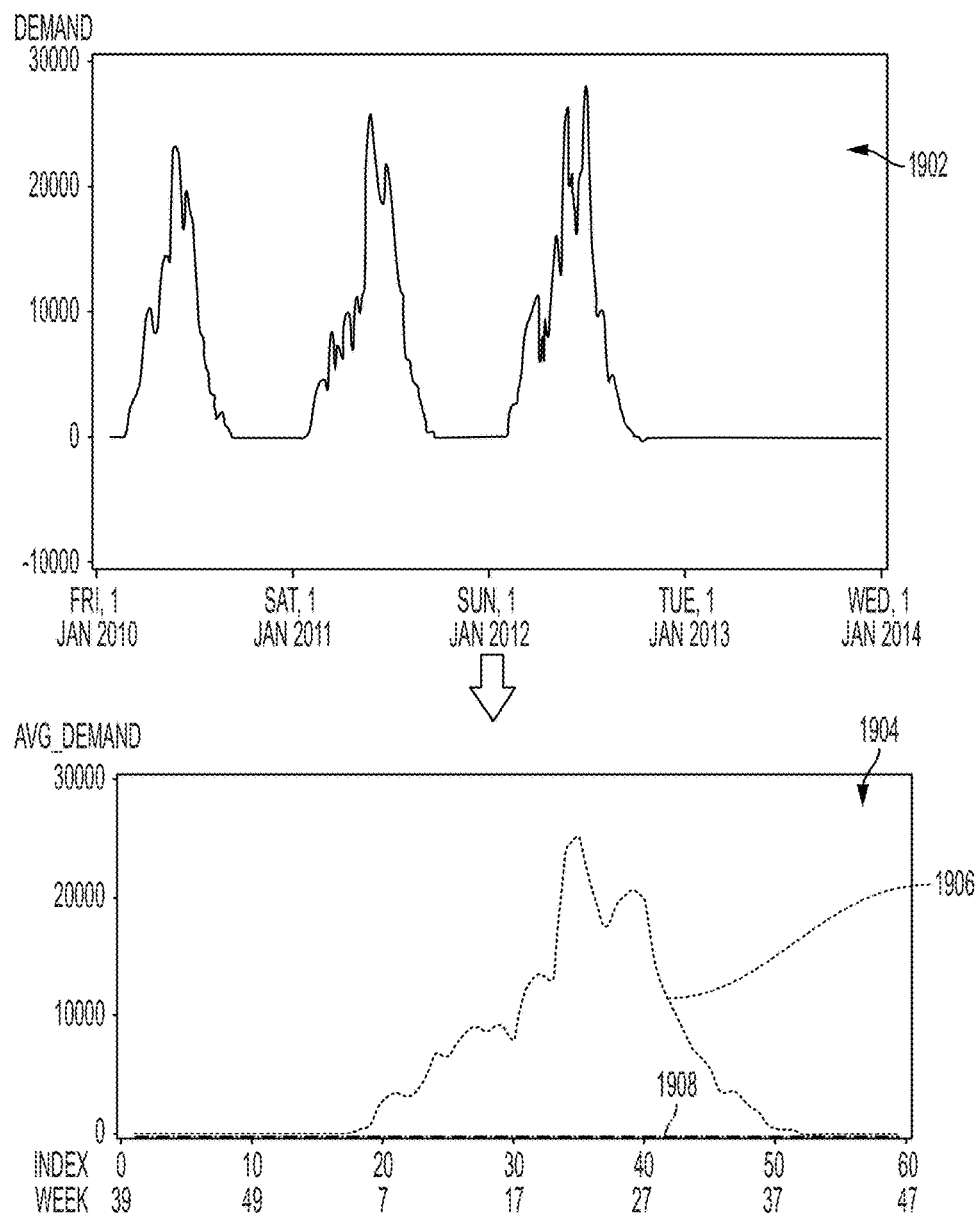
FIG. 19 depicts graphs showing another example of a profile method for identifying retired or inactive time series according to some aspects.

The processing device can determine whether the time series is intermittent by analyzing the characteristics of the time series. If the time series is not intermittent, the process can continue to block 1508, in which the processing device applies a profile method to determine whether the time series is active or inactive. The profile method can involve generating a historical profile for the time series, whereby the historical profile is an average of the past N seasons of data in the time series. An example of a historical profile 1806 is shown in graph 1804 of FIG. 18. After the processing device generates the historical profile, the processing device can compare the prediction data, period-by-period, with the historical profile. If for any period, the historical profile is active (e.g., has data points with non-zero values) while the prediction data has more than a threshold number of consecutive zeros, then the prediction data can be identified as having an abnormal data-point pattern, specifically an improper inactivity pattern. For example, as shown in FIG. 18, a portion of the prediction data 1802 is overlaid on the historical profile 1806 in graph 1804. Since there are only a few consecutive zeros 1808 in the prediction data 1802 overlapping with the active period in the historical profile 1806, the processing device can determine that there is not an abnormal data-point pattern in the prediction data 1802. In contrast, FIG. 19 depicts an example in which a prediction data 1902 is compared to a historical profile 1906 in graph 1904. Since there are consecutive zeros 1908 throughout the entire active period in the historical profile 1906, the processing device can determine that there is an abnormal data-point pattern in the prediction data 1902.

Referring back to FIG. 15, if the time series is not intermittent, the process can continue to block 1510, in which the processing device can determine whether an accumulated version of the time-series is seasonal. The processing device can generate the "accumulated version of a time series" by accumulating values in the time series to a lower frequency (e.g., if the original time series has daily data, it can be accumulated to monthly or quarterly data). The processing device can then apply classical time-series decomposition to the accumulated version of the time-series to decompose the accumulated version of the time-series into its components parts, one of which can be a seasonal component. The processing device can analyze the seasonal component to identify any seasonality in the time series.

If the processing device determines that the accumulated version of the time series is seasonal, the process can continue to block 1514, in which the processing device applies the basic rules and the profile method on the accumulated version of the time series to determine whether it is active or inactive.

Figure 16:
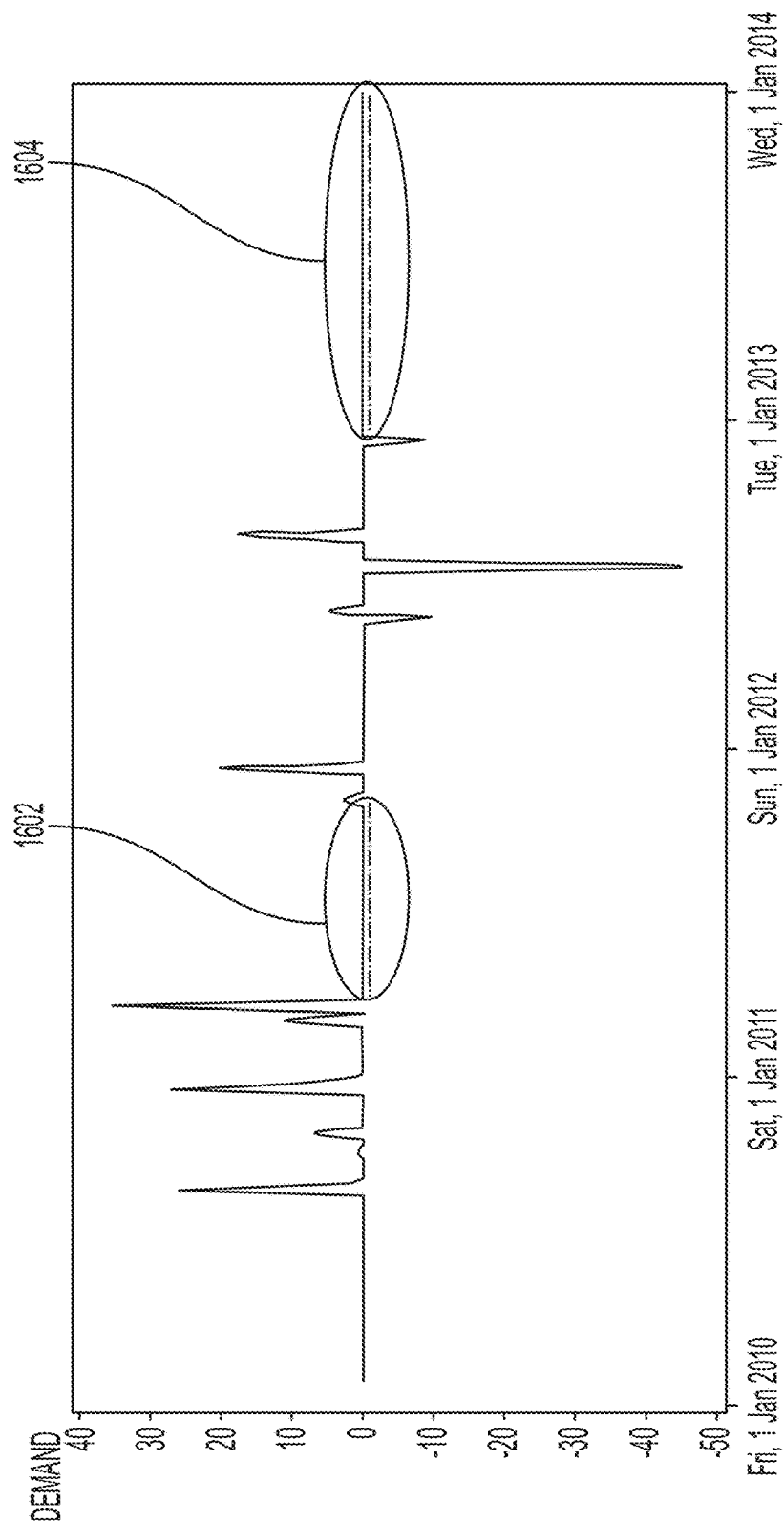
FIG. 16 is a graph of an example of a time series with trailing zeros according to some aspects.

If the processing device determines that the accumulated version of the time series is not seasonal, the process can continue to block 1516, in which the processing device applies an intermittent method on the original time series to determine whether the original time-series is active or inactive. The intermittent method can involve comparing the number of trailing zeros (e.g., consecutive data points with values of zero at the end of a time series) in the time series to all of the other portions of the time series that have consecutive zeros and applying the following rules:

If the number of trailing zeros at the end of the time series is greater than the number of consecutive zeros in each of the other portions of the time series, then the time series is inactive. One example of this is shown in FIG. 16, in which there are more trailing zeros 1604 at the end of the time series than there are consecutive zeros 1602 elsewhere in the time series.

Figure 17:
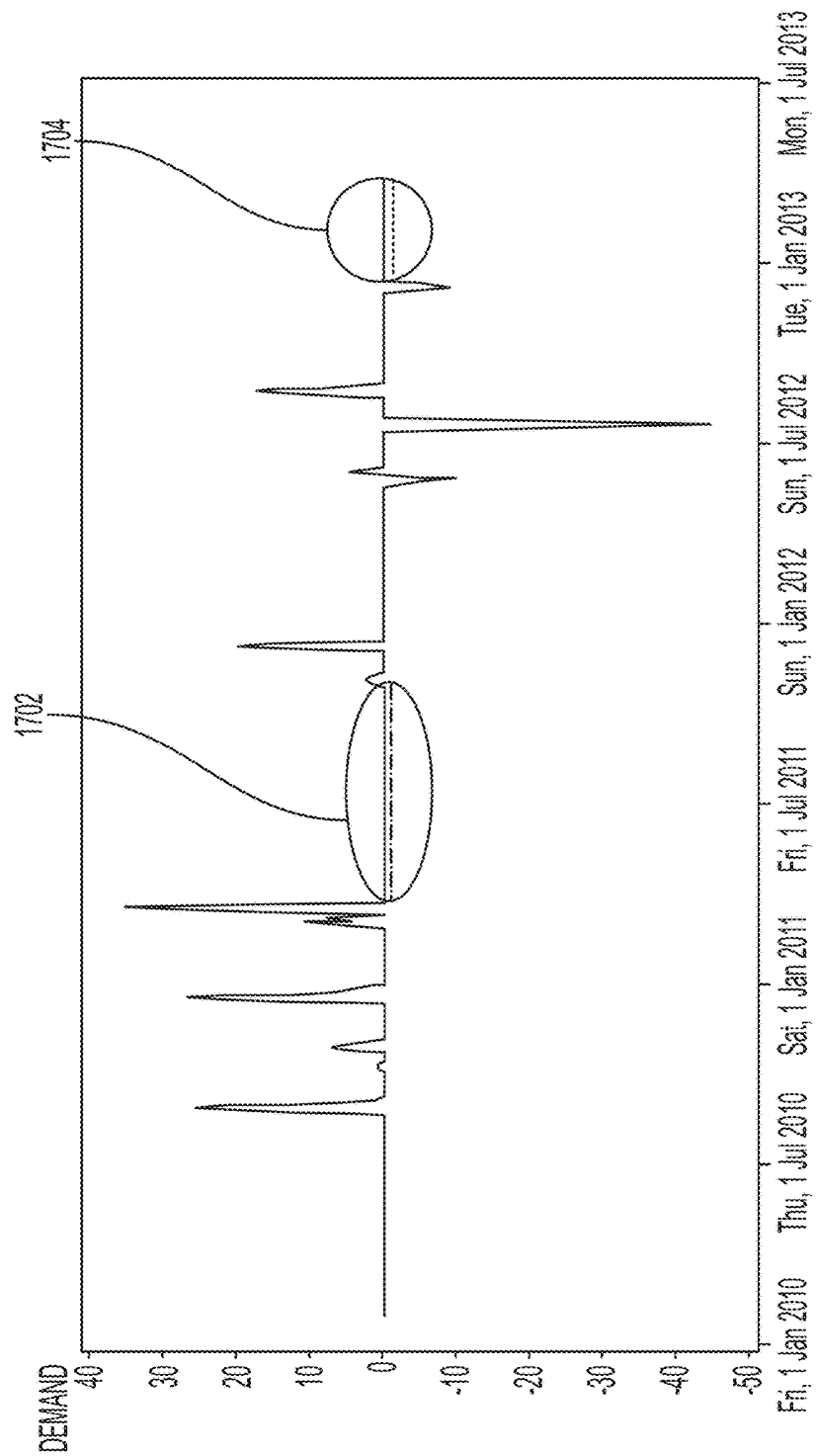
FIG. 17 is a graph of another example of a time series with trailing zeros according to some aspects.

Otherwise, the time series in active. One example of this is shown in FIG. 17, in which there are fewer trailing zeros 1704 at the end of the time series than there are consecutive zeros 1702 elsewhere in the time series.

While the above examples provide certain methods of identifying abnormal data-point patterns in prediction data, other examples can involve other methods of identifying abnormal data-point patterns in prediction data. For instance, in one example, the processing device can determine a first average-value of some or all of the data points in the prediction data, determine a second average-value of some or all of the data points in the historical dataset, and compare the first average-value to the second average-value. If there is a difference between the two that exceeds a threshold amount, the processing device can determine that the prediction data has an abnormal data-point pattern. As another example, the processing device can compare a first data-point pattern occurring within certain timespan of the prediction data to a second data-point pattern within the same timespan in the historical dataset to determine if a difference exists between the two. If so, the difference may signify an abnormal data-point pattern in the prediction data. The processing device can compare any number and combination of characteristics of the prediction data to any number and combination of characteristics the historical dataset to identify one or more abnormal data-point patterns. Further, any number and combination of the methods described herein can be combined to identify one or more abnormal data-point patterns in the prediction data.

In some examples, the processing device can identify one or more abnormal data-point patterns in the prediction data by performing only a single pass through the prediction data. This can involve segmenting the prediction data into windows of data and analyzing each respective data-window using all of the preprogrammed rules and files (e.g., files 1106 of FIG. 11) to detect abnormal data-point patterns therein before moving onto the next data-window. This can prevent the processing device from having to repeatedly search through all of the prediction data (e.g., separately for each individual rule or file), which can significantly cut down on processing cycles, memory accesses, and memory usage when analyzing the prediction data, thereby significantly improving the performance of the monitoring system.

If the processing device detects at least one abnormal data-point pattern associated with the prediction data, the processing device can flag the prediction data as being potentially erroneous. For example, the processing device can flag the prediction data in a graphical user interface by displaying an icon or textual indicator proximate to the prediction data. This can enable a user can further assess the prediction data manually.

Referring back to FIG. 11, if the processing device determines that the prediction data 1102 does not include an abnormal data-point pattern, the process can end. Otherwise, the process can proceed to block 1110. At block 1110, the processing device can identify one or more override processes 1112 corresponding to the abnormal data-point pattern(s) 1108 identified in block 1104. An override process is a process by which a value of a data point in the prediction data 1102 is replaced with a new value in order to mitigate the effect of the abnormal data-point pattern 1108 on the prediction data 1102. Examples of the an override process can include overriding the value of a particular data point in the prediction data 1102 with (i) an average value of the last N data-points preceding the particular data point; (ii) an average value of all the data-points in the historical dataset; (iii) a moving average; (iv) a value determined by random walk; (v) a user defined value or a value derived from a user-defined function; or (vi) any combination of these.

In some examples, the processing device can identify the override process(es) corresponding to the abnormal data-point pattern(s) 1108 using a database. The database can include relationships between override processes and abnormal data-point patterns. The processing device can use the database to map the abnormal data-point pattern 1108 to one or more corresponding override processes 1112.

In other examples, the processing device can use the files 1106 to identify the override processes 1112. For example, the files 1106 can include program code for implementing one or more override processes. Each of the files 1106 may also include an indicator (e.g., a commented statement) specifying one or more abnormal data-point patterns that can be corrected by the override process defined therein. The processing device can analyze some or all of the files 1106 to determine which file(s) correspond to the abnormal data-point pattern 1108.

While the above examples may involve the processing device automatically selecting the override process(es) 1112 associated with the abnormal data-point pattern 1108, in other examples the user can specify the override process(es) 1112. For example, the processing device may provide a graphical user interface with a list of candidate override processes from which a user can manually select one or more override processes 1112 to be used to correct the abnormal data-point pattern 1108. In some examples, the processing device can generate the list of candidate override processes based on the abnormal data-point pattern 1108. For example, the processing device can use a database or preprogrammed rules to determine one or more candidate override-processes that correspond to the abnormal data-point pattern. In other examples, the processing device can generate the list using a default set of candidate override processes.

After identifying one or more override processes 1112 associated with the prediction data 1102, the process can proceed to block 1114. At block 1114, the processing device generates a corrected version of the prediction data 1116 by applying the override process(es) 1112 to the prediction data 1102. More specifically, the processing device can apply an override process by executing one or more preprogrammed rules, functions, or program code associated with the override process. For example, the processing device can implement an override process by interpreting or executing program code in the files 1106 (or otherwise preprogrammed into the system) defining the override process. As another example, the processing device can implement a user-defined override process by performing user-defined operations that make up the override process.

In some examples, the processing device can apply multiple override processes to the prediction data 1102 to generate the corrected version of the prediction data 1116. The processing device can apply the override processes in a preset order. For example, the processing device may have identified multiple abnormal data-point patterns in block 1104. The processing device may have then identified a corresponding override process for each of the abnormal data-point patterns in block 1110. Since some override processes may impact other override processes, it may be desirable to implement the override processes in a particular order. To determine the particular order, the processing device can reference a data source (e.g., a configuration file) that specifies how the override processes are to be applied. The processing device can then apply the override processes in the order specified by the data source.

In block 1118, the processing device adjusts one or more computer parameters based on the corrected version of the prediction data 1116. The one or more computer parameters can be adjusted so as to avoid or reduce the impact of a computer failure. Examples of the computer parameters can include (i) how data is allocated among computer processes, (ii) a setting for a piece of software on the computer, (iii) what software is running on the computer, (iv) how data is accessed or retrieved by the computer, (v) what data is stored on the computer or a storage location of the data, (vi) or any combination of these.

As a particular example, the processing device can analyze the characteristics (e.g., the magnitudes, frequencies, etc.) of the data points in the corrected prediction data 1116 for certain anomalies, such as unusual patterns and/or statistical outliers. These anomalies can be associated with various types of computer failures. The processing device can detect these anomalies using preprogrammed rules or a database identifying the anomalies. If the processing device identifies an anomaly in the corrected version of the prediction data 1116, the processing device can then determine a mitigation method associated with a computer failure related to the anomaly. For example, the processing device can access a database having mitigation methods correlated to anomalies and select therefrom a particular mitigation method corresponding to the anomaly. The mitigation method may include one or more operations configured to avoid the computer failure related to the anomaly or reduce the impact of the computer failure. The processing device can then execute the mitigation method.

While FIG. 11 depicts a process being applied to a single set of prediction data 1102 for simplicity, it will be appreciated that some or all of this process can be repeated for multiple, individual sets of prediction data. For example, there may be hundreds of thousands or millions of sets of prediction data, with each set of prediction data representing a different predictions. The sets of prediction data may need to be analyzed for errors (e.g., abnormal data-point patterns) and anomalies. This type of large-scale data analysis would be impossible to perform manually. But some examples of the present disclosure can significantly simplify and expedite the analysis of large amounts of data to identify errors and anomalies, while producing more accurate results than could be achieved manually (if at all). This may enable greater autonomous control over computers to prevent failures.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
a processing device; and
a memory device including instructions that are executable by the processing device for causing the processing device to:
receive prediction data representing a prediction, wherein the prediction data forms a time series that spans a future time-period;
receive a plurality of files defining abnormal data-point patterns to be identified in the prediction data, wherein each file in the plurality of files includes customizable program-code for identifying a respective abnormal pattern of data-point values in the prediction data;
automatically identify a plurality of abnormal data-point patterns in the prediction data by interpreting and executing the customizable program-code in the plurality of files;
automatically determine a plurality of override processes that correspond to the plurality of abnormal data-point patterns in response to identifying the plurality of abnormal data-point patterns in the prediction data, wherein the plurality of override processes are automatically determined using correlations between the plurality of abnormal data-point patterns and the plurality of override processes, and wherein an override process involves replacing a value of at least one data point in the prediction data with another value that is configured to mitigate an impact of an abnormal data-point pattern on the prediction;
automatically determine that the plurality of override processes are to be applied to the prediction data in a particular order;
automatically generate a corrected version of the prediction data in response to determining the plurality of override processes, wherein the corrected version of the prediction data is generated by executing the plurality of override processes in the particular order; and
automatically adjust one or more computer parameters based on the corrected version of the prediction data.

2. The system of claim 1, wherein the memory device further includes instructions that are executable by the processing device for causing the processing device to determine the particular order based on a configuration file specifying the particular order.

3. The system of claim 1, wherein the memory device further includes instructions that are executable by the processing device for causing the processing device to flag the prediction as potentially erroneous in response to identifying the at last one plurality of abnormal data-point patterns in a historical dataset used to generate the prediction data.

4. The system of claim 1, wherein the memory device further includes instructions that are executable by the processing device for causing the processing device to automatically identify the plurality of abnormal data-point patterns in the prediction data by performing only a single pass through the prediction data.

5. The system of claim 1, wherein the plurality of abnormal data-point patterns includes a first abnormal data-point pattern and a second abnormal data-point pattern, and wherein the memory device further includes instructions that are executable by the processing device for causing the processing device to:
automatically determine the second abnormal data-point pattern associated with the prediction data by analyzing characteristics of a historical dataset used to generate the prediction data;
automatically determine that the first abnormal data-point pattern corresponds to a first override-process and the second abnormal data-point pattern corresponds to a second override-process using the correlations; and
automatically generate the corrected version of the prediction data at least in part by executing the second override-process in the particular order with respect to the first override-process.

6. The system of claim 5, wherein the memory device further includes instructions that are executable by the processing device for causing the processing device to automatically determine the second abnormal data-point pattern by:
determining that the historical dataset used to generate the prediction data has a series of consecutive data points with values of zero spanning at least an entire season cycle within the historical dataset.

7. The system of claim 5, wherein the memory device further includes instructions that are executable by the processing device for causing the processing device to automatically determine the second abnormal data-point pattern by:
  determining that an end of the prediction data has consecutive data-points with values of zero;
  determining whether any timespan in the historical dataset that was used to generate the prediction data includes at least as many consecutive data-points with values of zero as are at the end of the prediction data; and
  detecting the second abnormal data-point pattern in response to determining that there is no timespan in the historical dataset that includes at least as many consecutive data-points with values of zero as are at the end of the prediction data.

8. The system of claim 5, wherein the memory device further includes instructions that are executable by the processing device for causing the processing device to automatically determine that the prediction data has the second abnormal data-point pattern by:
  generating a historical profile for a timespan of the historical dataset that was used to generate the prediction data, wherein the historical profile is an average of multiple seasons of information within the historical dataset;
  determining that the timespan in the historical profile is an active period in which there are no consecutive data-points with values of zero;
  analyzing the same timespan in the prediction to determine that the timespan in the prediction data is an inactive period in which there are consecutive data-points with values of zero; and
  determining that the prediction data has the second abnormal data-point pattern in response to determining that the timespan represents an active period in the historical profile and an inactive period in the prediction data.

9. The system of claim 5, wherein the memory device further includes instructions that are executable by the processing device for causing the processing device to automatically determine that the prediction data has the second abnormal data-point pattern by:
  determining an average value of the prediction data;
  determining another average value of the historical dataset that was used to generate the prediction data;
  determining that the average value of the prediction data is different from the other average value of the historical dataset by more than a threshold amount; and
  determining that the prediction data has the second abnormal data-point pattern in response to determining that the average value of the prediction data is different from the other average value of the historical dataset by more than the threshold amount.

10. The system of claim 5, wherein the memory device further includes instructions that are executable by the processing device for causing the processing device to automatically determine that the prediction data has the second abnormal data-point pattern by:
  automatically comparing (i) a data-point pattern during a time period in the prediction data to (ii) another data-point pattern during the time period in the historical dataset that was used to generate the prediction data in order to determine a difference between the data-point patterns; and
  automatically determining that the difference between the data-point patterns is indicative of the second abnormal data-point pattern in the prediction data.

11. A non-transitory computer-readable medium comprising program code that is executable by a processing device for causing the processing device to:
  receive prediction data representing a prediction, wherein the prediction data forms a time series that spans a future time-period;
  receive a plurality of files defining abnormal data-point patterns to be identified in the prediction data, wherein each file in the plurality of files includes customizable program-code for identifying a respective abnormal pattern of data-point values in the prediction;
  automatically identify a plurality of abnormal data-point patterns in the prediction data by interpreting and executing the customizable program-code in the plurality of files;
  automatically determine a plurality of override processes that correspond to the plurality of abnormal data-point patterns in response to identifying the plurality of abnormal data-point patterns in the prediction data, wherein the plurality of override processes are automatically determined using correlations between the plurality of abnormal data-point patterns and the plurality of override processes, and wherein an override process involves replacing a value of at least one data point in the prediction data with another value that is configured to mitigate an impact of an abnormal data-point pattern on the prediction;
  automatically determine that the plurality of override processes are to be applied to the prediction data in a particular order;
  automatically generate a corrected version of the prediction data in response to determining the plurality of override processes, wherein the corrected version of the prediction data is generated by executing the plurality of override processes in the particular order; and
  automatically adjust one or more computer parameters based on the corrected version of the prediction data.

12. The non-transitory computer-readable medium of claim 11, further comprising program code that is executable by the processing device for causing the processing device to determine the particular order based on a configuration file specifying the particular order.

13. The non-transitory computer-readable medium of claim 11, further comprising program code that is executable by the processing device for causing the processing device to flag the prediction data as potentially erroneous in response to identifying the plurality of abnormal data-point patterns in a historical dataset that was used to generate the prediction data.

14. The non-transitory computer-readable medium of claim 11, further comprising program code that is executable by the processing device for causing the processing device to automatically identify the plurality of abnormal data-point patterns in the prediction data by performing only a single pass through the prediction data.

15. The non-transitory computer-readable medium of claim 11, wherein the plurality of abnormal data-point patterns includes a first abnormal data-point pattern and a second abnormal data-point pattern, and further comprising program code that is executable by the processing device for causing the processing device to:
  automatically determine the second abnormal data-point pattern associated with the prediction data by analyzing characteristics of a historical dataset used to generate the prediction data;
  automatically determine that the first abnormal data-point pattern corresponds to a first override-process and the second abnormal data-point pattern corresponds to a second override-process using the correlations; and automatically generate the corrected version of the prediction data at least in part by executing the second override-process in the particular order with respect to the first override-process.

16. The non-transitory computer-readable medium of claim 15, further comprising program code that is executable by the processing device for causing the processing device to automatically determine the second abnormal data-point pattern by:

determining that the historical dataset that was used to generate the prediction data has a series of consecutive data points with values of zero spanning at least an entire season cycle within the historical dataset.

17. The non-transitory computer-readable medium of claim 15, further comprising program code that is executable by the processing device for causing the processing device to automatically determine the second abnormal data-point pattern by:

determining that an end of the prediction data has consecutive data-points with values of zero;

determining whether any timespan in the historical dataset that was used to generate the prediction data includes at least as many consecutive data-points with values of zero as are at the end of the prediction data; and detecting the second abnormal data-point pattern in response to determining that there is no timespan in the historical dataset that includes at least as many consecutive data-points with values of zero as are at the end of the prediction data.

18. The non-transitory computer-readable medium of claim 15, further comprising program code that is executable by the processing device for causing the processing device to automatically determine that the prediction has the second abnormal data-point pattern by:

generating a historical profile for a timespan of the historical dataset that was used to generate the prediction data, wherein the historical profile is an average of multiple seasons of information within the historical dataset;

determining that the timespan in the historical profile is an active period in which there are no consecutive data-points with values of zero;

analyzing the same timespan in the prediction data to determine that the timespan in the prediction data is an inactive period in which there are consecutive data-points with values of zero; and determining that the prediction data has the second abnormal data-point pattern in response to determining that the timespan represents an active period in the historical profile and an inactive period in the prediction data.

19. The non-transitory computer-readable medium of claim 15, further comprising program code that is executable by the processing device for causing the processing device to automatically determine that the prediction data has the second abnormal data-point pattern by:

determining an average value of the prediction data;

determining another average value of the historical dataset that was used to generate the prediction data;

determining that the average value of the prediction data is different from the other average value of the historical dataset by more than a threshold amount; and determining that the prediction data has the second abnormal data-point pattern in response to determining that the average value of the prediction data is different from the other average value of the historical dataset by more than the threshold amount.

20. The non-transitory computer-readable medium of claim 15, further comprising program code that is executable by the processing device for causing the processing device to automatically determine that the prediction has the second abnormal data-point pattern by:

automatically comparing (i) a data-point pattern during a time period in the prediction data to (ii) another data-point pattern during the time period in the historical dataset that was used to generate the prediction data in order to determine a difference between the data-point patterns; and automatically determining that the difference between the data-point patterns is indicative of the second abnormal data-point pattern in the prediction data.

21. A method comprising:

receiving, by a processing device, prediction data representing a prediction, wherein the prediction data forms a time series that spans a future time-period;

receiving, by the processing device, a plurality of files defining abnormal data-point patterns to be identified in the prediction data, wherein each file in the plurality of files includes customizable program-code for identifying a respective abnormal pattern of data-point values in the prediction data;

automatically identifying, by the processing device, a plurality of abnormal data-point patterns in the prediction data by interpreting and executing the customizable program-code in the plurality of files;

automatically determining, by the processing device, a plurality of override processes that correspond to the plurality of abnormal data-point patterns in response to identifying the plurality of abnormal data-point patterns in the prediction data, wherein the plurality of override processes are automatically determined using correlations between the plurality of abnormal data-point patterns and the plurality of override processes, and wherein an override process involves replacing a value of at least one data point in the prediction data with another value that is configured to mitigate an impact of an abnormal data-point pattern on the prediction;

automatically determining, by the processing device, that the plurality of override processes are to be applied to the prediction data in a particular order;

automatically generating, by the processing device, a corrected version of the prediction data in response to determining the plurality of override processes, wherein the corrected version of the prediction data is generated by executing the plurality of override processes in the particular order; and automatically adjusting, by the processing device, one or more computer parameters based on the corrected version of the prediction data.

22. The method of claim 21, further comprising determining the particular order based on a configuration file specifying the particular order.

23. The method of claim 21, further comprising flagging the prediction as potentially erroneous in response to identifying the plurality of abnormal data-point patterns in a historical dataset used to generate the prediction data.

24. The method of claim 21, further comprising automatically identifying the plurality of abnormal data-point patterns in the prediction data by performing only a single pass through the prediction data.

25. The method of claim 21, wherein the plurality of abnormal data-point patterns includes a first abnormal data-point pattern and a second abnormal data-point pattern, and further comprising:
  automatically determining the second abnormal data-point pattern associated with the prediction data by analyzing characteristics of a historical dataset used to generate the prediction data;
  automatically determining that the first abnormal data-point pattern corresponds to a first override-process and the second abnormal data-point pattern corresponds to a second override-process using the correlations; and
  automatically generating the corrected version of the prediction data at least in part by executing the second override-process in the particular order with respect to the first override-process.

26. The method of claim 25, further comprising automatically determining the second abnormal data-point pattern by:
  determining that the historical dataset that was used to generate the prediction data has a series of consecutive data points with values of zero spanning at least an entire season cycle within the historical dataset.

27. The method of claim 25, further comprising automatically determining the second abnormal data-point pattern by:
  determining that an end of the prediction data has consecutive data-points with values of zero;
  determining whether any timespan in the historical dataset that was used to generate the prediction data includes at least as many consecutive data-points with values of zero as are at the end of the prediction data; and
  detecting the second abnormal data-point pattern in response to determining that there is no timespan in the historical dataset that includes at least as many consecutive data-points with values of zero as are at the end of the prediction data.

28. The method of claim 25, further comprising automatically determining that the prediction data has the second abnormal data-point pattern by:
  generating a historical profile for a timespan of the historical dataset that was used to generate the prediction data, wherein the historical profile is an average of multiple seasons of information within the historical dataset;
  determining that the timespan in the historical profile is an active period in which there are no consecutive data-points with values of zero;
  analyzing the same timespan in the prediction data to determine that the timespan in the prediction data is an inactive period in which there are consecutive data-points with values of zero; and
  determining that the prediction data has the second abnormal data-point pattern in response to determining that the timespan represents an active period in the historical profile and an inactive period in the prediction.

29. The method of claim 25, further comprising automatically determining that the prediction has the second abnormal data-point pattern by:
  determining an average value of the prediction data;
  determining another average value of the historical dataset that was used to generate the prediction data;
  determining that the average value of the prediction data is different from the other average value of the historical dataset by more than a threshold amount; and
  determining that the prediction data has the second abnormal data-point pattern in response to determining that the average value of the prediction data is different from the other average value of the historical dataset by more than the threshold amount.

30. The method of claim 25, further comprising automatically determining that the prediction has the second abnormal data-point pattern by:
  automatically comparing (i) a data-point pattern during a time period in the prediction data to (ii) another data-point pattern during the time period in the historical dataset that was used to generate the prediction data in order to determine a difference between the data-point patterns; and
  automatically determining that the difference between the data-point patterns is indicative of the second abnormal data-point pattern in the prediction data.

* * * * *

UNITED STATES PATENT AND TRADEMARK OFFICE
CERTIFICATE OF CORRECTION

PATENT NO. : 10,338,994 B1
APPLICATION NO. : 16/165331
DATED : July 2, 2019
INVENTOR(S) : Jingrui Xie et al.

Page 1 of 1

It is certified that error appears in the above-identified patent and that said Letters Patent is hereby corrected as shown below:

In the Claims

Column 34, Lines 29-30, Claim 3 replace 'identifying the at last one plurality;' with --identifying the plurality--

Signed and Sealed this
Fourteenth Day of April, 2020

Andrei Iancu
*Director of the United States Patent and Trademark Office*